(12) United States Patent
Lin et al.

(10) Patent No.: US 11,372,746 B2
(45) Date of Patent: Jun. 28, 2022

(54) DIRECTED GRAPH FOR APPLICATION UNDER TEST

(71) Applicant: MICRO FOCUS LLC, Santa Clara, CA (US)

(72) Inventors: Zhenbin Lin, Shanghai (CN); Qian-Ru Zhai, Shanghai (CN); Ye Jiang, Shanghai (CN); Meng-Jie Chen, Shanghai (CN); Douglas Grover, Provo, UT (US)

(73) Assignee: MICRO FOCUS LLC, Santa Clara, CA (US)

( * ) Notice: Subject to any disclaimer, the term of this patent is extended or adjusted under 35 U.S.C. 154(b) by 0 days.

(21) Appl. No.: 16/923,394

(22) Filed: Jul. 8, 2020

(65) Prior Publication Data
US 2022/0012166 A1     Jan. 13, 2022

(51) Int. Cl.
   *G06F 9/44*        (2018.01)
   *G06F 11/36*       (2006.01)
   *G06F 3/04842*     (2022.01)

(52) U.S. Cl.
   CPC ...... *G06F 11/3664* (2013.01); *G06F 3/04842* (2013.01); *G06F 11/3612* (2013.01); *G06F 11/3688* (2013.01)

(58) Field of Classification Search
   CPC ............. G06F 11/3664; G06F 3/04842; G06F 11/3612; G06F 11/3688
   See application file for complete search history.

(56) References Cited

U.S. PATENT DOCUMENTS

| | | | |
|---|---|---|---|
| 5,933,640 A * | 8/1999 | Dion | G06F 8/433 717/132 |
| 7,165,189 B1 | 1/2007 | Lakkapragada et al. | |
| 8,739,128 B1 | 5/2014 | Cohen et al. | |
| 9,600,401 B1 * | 3/2017 | Haischt | G06F 11/3664 |
| 9,842,045 B2 | 12/2017 | Heorhiadi et al. | |
| 10,545,856 B2 | 1/2020 | Singi et al. | |
| 2006/0010428 A1* | 1/2006 | Rushby | G06F 11/3684 717/124 |
| 2009/0113399 A1* | 4/2009 | Tzoref | G06F 11/3632 717/130 |
| 2010/0070929 A1* | 3/2010 | Behl | G06F 16/958 715/854 |
| 2011/0173239 A1* | 7/2011 | Sayed | G06F 11/3414 718/1 |

(Continued)

OTHER PUBLICATIONS

Memon, A.M., "An Event-Flow model of GUI-Based Applications for Testing", Softw. Test. Verif. Reliab. 2007; 17:137-157, Jan. 2, 2007.

(Continued)

*Primary Examiner* — Hang Pan

(57) ABSTRACT

A directed graph for an application under test (AUT) hosted at a hosting computing device is generated based on test flows. Each test flow traverses GUI objects of the AUT via GUI events. Each GUI event is associated with a transition from a first GUI object of the AUT to a second GUI object of the AUT. The GUI event represents interaction with the GUI of the AUT at a client computing device and that resulted in the transition. The directed graph includes nodes that each correspond to a GUI object of the AUT and edges that each correspond to a GUI event.

20 Claims, 15 Drawing Sheets

(56) References Cited

U.S. PATENT DOCUMENTS

2014/0351797 A1* 11/2014 Kalayci ............... G06F 11/3624
717/127
2015/0301926 A1* 10/2015 Giannelos ............. G06F 3/0484
717/125
2016/0306734 A1* 10/2016 Bates ........................ G06F 8/70

OTHER PUBLICATIONS

Memon, A.M., "Automatically Repairing Event Sequence-Based GUI Test Suites for Regression Testing", ACM Trans. on Comp. Logic, Sep. 2007, 35 pp.

Marinescu, P.D. et al., "Efficient Testing of Recovery Code Using Fault Injection", ACM Trans. on Computer Sys., vol. 29, No. 4, Dec. 2011, 38 pp.

Retna et al., "Study Paper on Test Case Generation for GUI Based Testing", Int'l J. Soft. Eng. & Appl. (IJSEA), vol. 3, No. 1, Jan. 2012, 139-147.

* cited by examiner

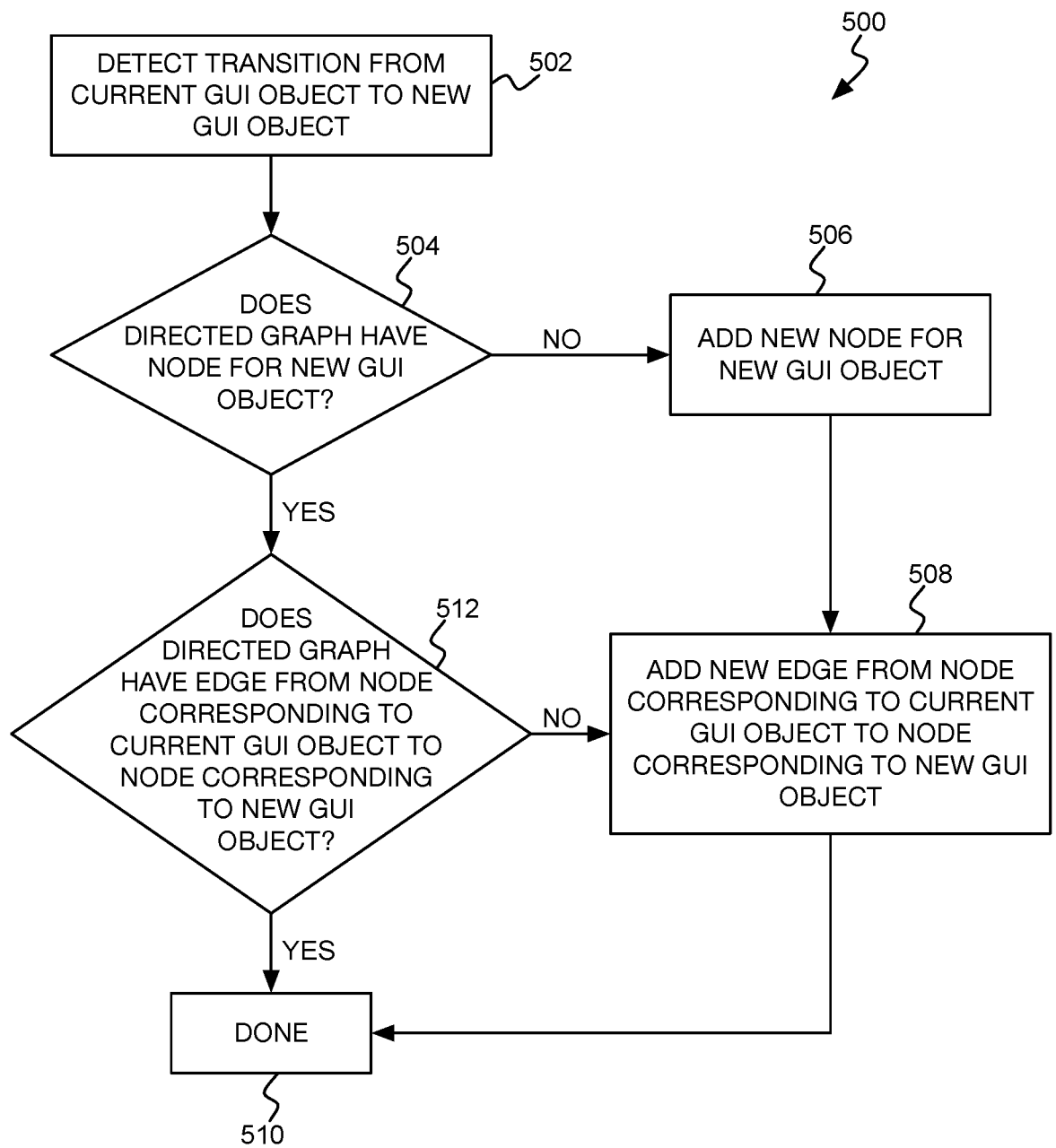

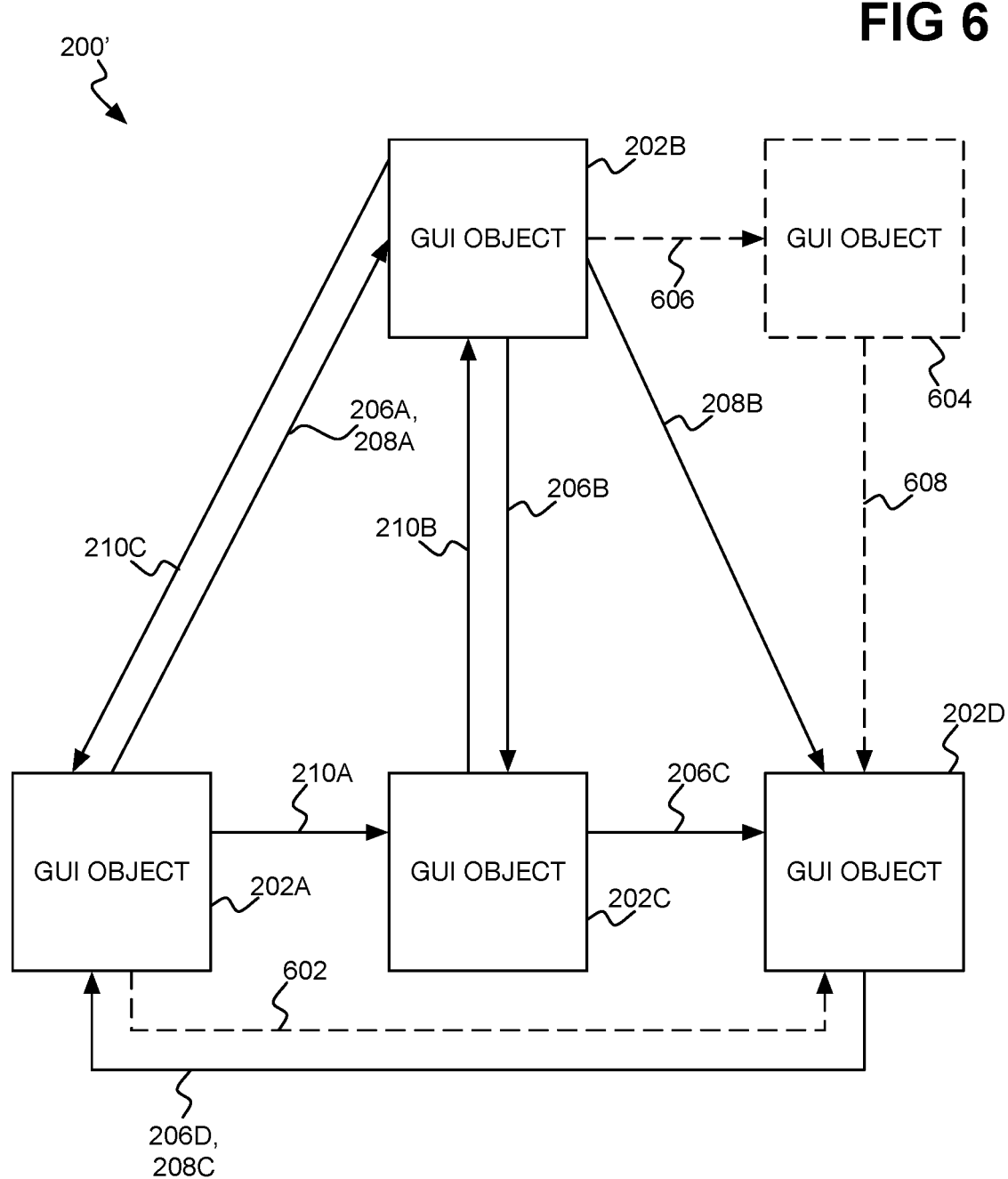

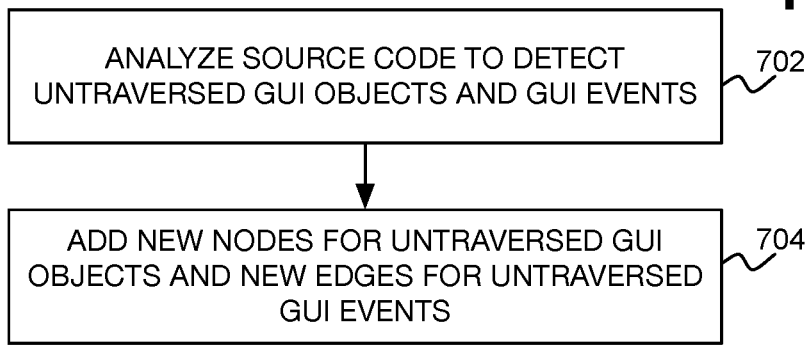
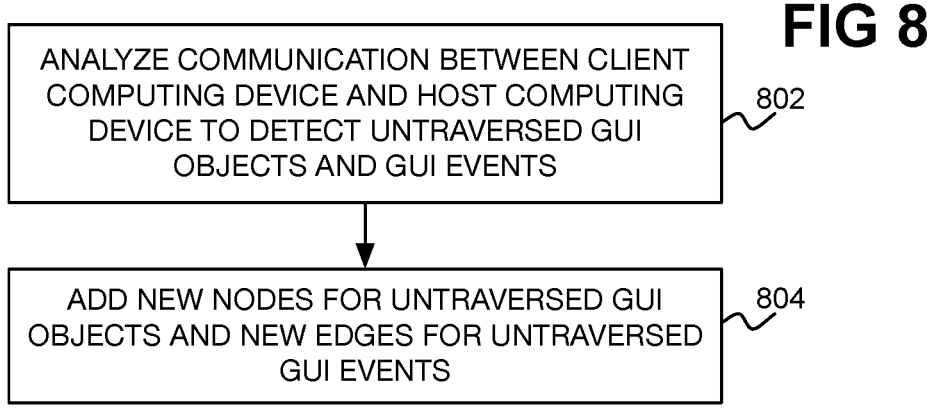
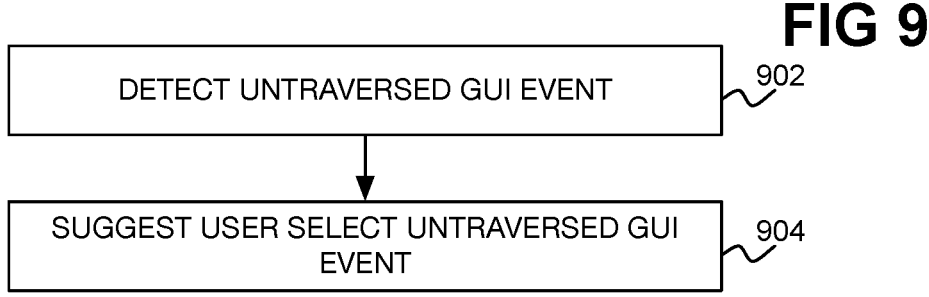
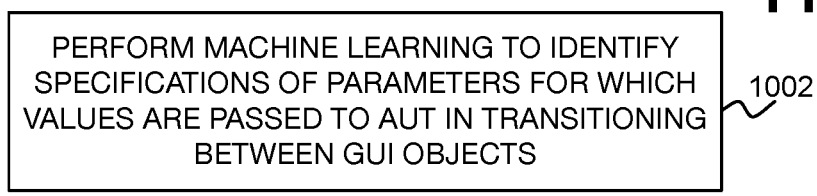

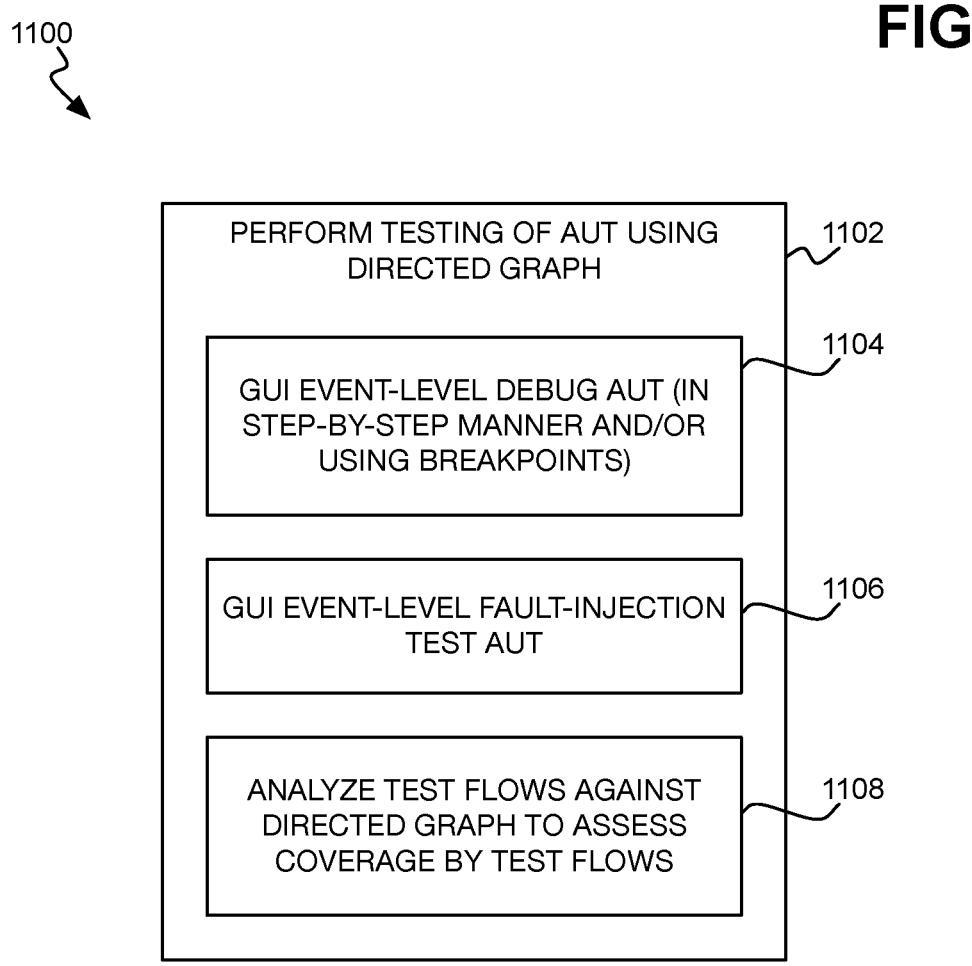

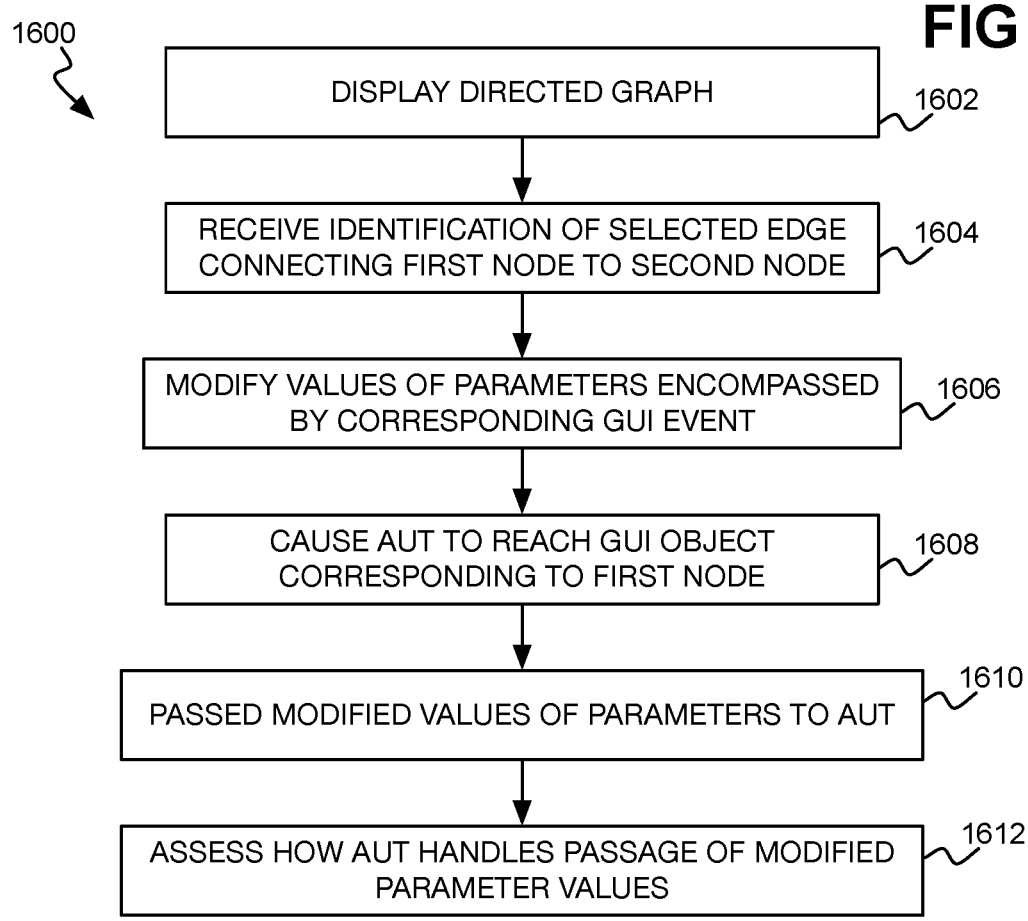
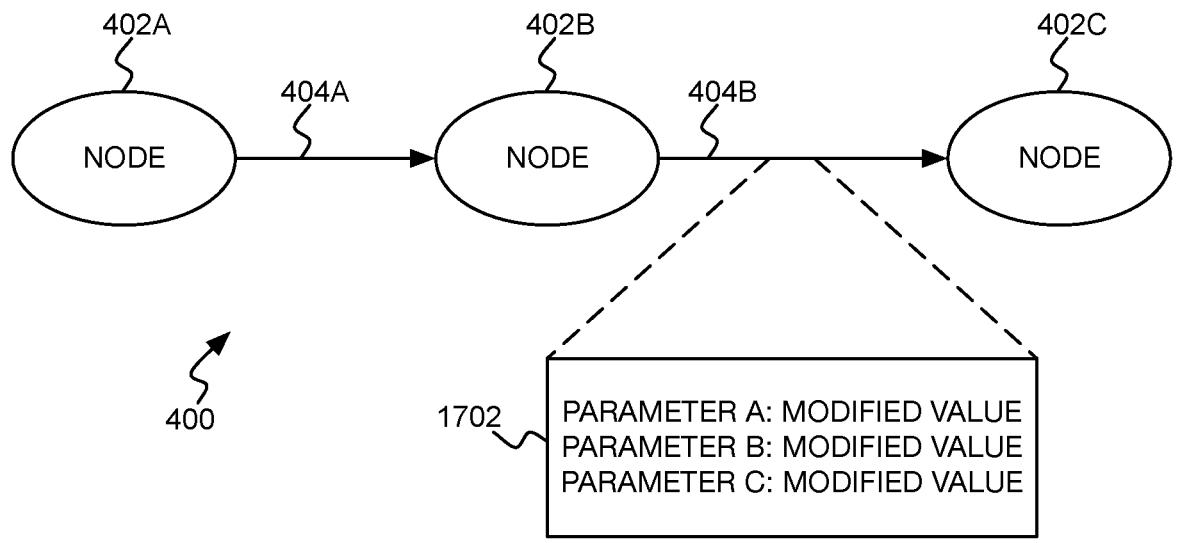

DIRECTED GRAPH FOR APPLICATION UNDER TEST

BACKGROUND

Computing devices like desktops, laptops, and other types of computers, as well as mobile computing devices like smartphones, among other types of computing devices, run software, which can be referred to as applications, to perform intended functionality. An application may be a so-called native application that runs on a computing device directly, or may a web application or "app" at least partially run on a remote computing device accessible over a network, such as via a web browser running on a local computing device. To ensure that an application has been developed correctly to perform its intended functionality and that the application is operating correctly, the application may be tested.

BRIEF DESCRIPTION OF THE DRAWINGS

FIG. 5 is a flowchart of an example method for generating a directed graph for an AUT, and which may be used in or consistently with the method of FIG. 3.

FIG. 6 is a diagram of an example graphical user interface of an AUT and that includes an untraversed GUI object and an untraversed GUI event.

FIGS. 7, 8, 9 are flowcharts of different example methods for identifying untraversed GUI objects and GUI events of an AUT.

FIG. 10 is a flowchart of an example method for identifying specification of parameters for which values are passed to the AUT in transitioning between GUI objects.

FIG. 11 is a flowchart of an example method for performing testing of an AUT based on a directed graph for the AUT.

FIG. 16 is a flowchart of an example method for performing GUI event-level fault-injection testing of an AUT, based on a directed graph for the AUT.

FIG. 17 is a diagram illustrating example performance of the method of FIG. 16.

DETAILED DESCRIPTION

Figure 1:
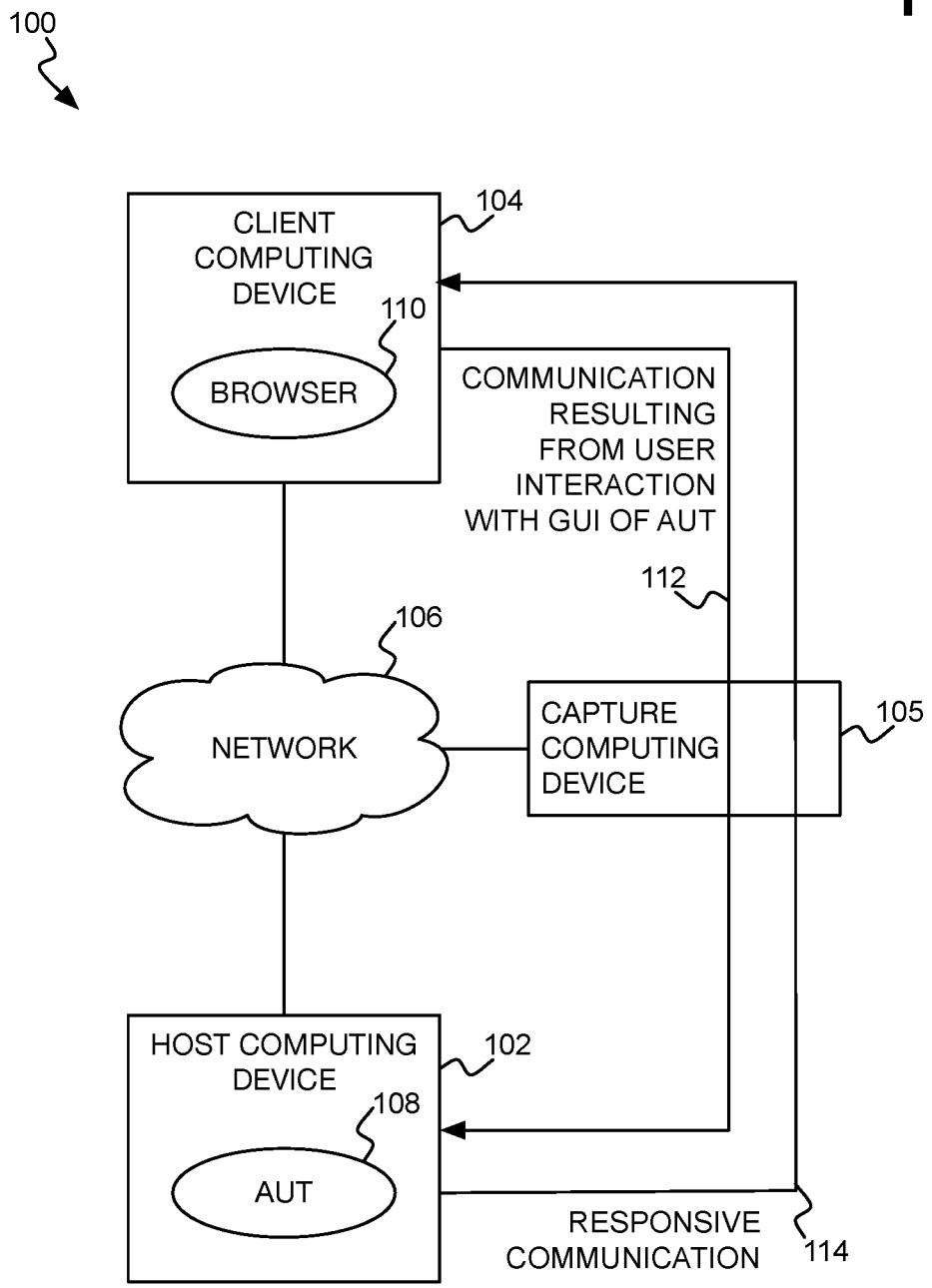
FIG. 1 is a diagram of an example system in which testing of an application under test (AUT) can occur.

As noted in the background, an application is a computer program that is run, or executed, to perform intended functionality, and which may be tested to ensure that the application performs its intended functionality correctly. An application being tested may be referred to as an application under test (AUT). An AUT may expose a graphical user interface (GUI). During testing, different parts of the GUI can be actuated, or selected, in sequences to verify that the application operates as expected. These sequences may be referred to as test flows.

Techniques described herein improve testing and debugging of an AUT that can be tested by having its GUI objects traversed via test flows. A GUI object may be a window or another view in a given state that the AUT exposes. The GUI object can be displayed so that a user may interact with the GUI object. User interaction of the GUI object can result in the AUT exposing a different GUI object for display and user interaction. For example, when a user selects a menu, a set of menu items may now be exposed to the user. The different GUI object may be the same window or view in a different state, or an entirely different window or view, for instance.

The AUT may be hosted at a computing device, and a user may interact with the GUI of the AUT at a client computing device communicatively connected to the host computing device. Such user interaction may be monitored. Communication from the client computing device to the host computing device that results from user interaction with the GUI of the AUT at the client computing device may also be monitored. From this monitoring, a directed graph for the AUT is generated, without having to directly analyze source code for the AUT. The directed graph for the AUT is more specifically generated based on test flows.

Each test flow traverses GUI objects of the AUT via GUI events. Each GUI event is associated with a transition from one GUI object to another GUI object of the AUT and/or another view of the GUI object. A GUI event represents the user interaction with the GUI of the AUT that results in this transition. A GUI event can encompass values of parameters passed within the communication from the client device to the host computing device that occurred responsive to the user interaction that resulted in the transition in question. The directed graph that is generated includes nodes corresponding to the GUI objects traversed by the test flows and events corresponding to the GUI events traversed by the test flows.

The techniques described herein provide for different types of testing based on the generated directed graph for an AUT. For instance, the AUT may be debugged at the GUI event level using the directed graph, in a step-by-step manner or using breakpoints. Such GUI event-level debugging of the AUT occurs at a higher level than comparable debugging of source code for the AUT, which steps through source code in a line-by-line manner, or which adds breakpoints at lines of source code. Such higher level AUT debugging can permit errors or defects within the AUT to be more easily and quickly identified than source code debugging.

As another example, the AUT may be debugged by injecting faults at the GUI event level using the directed graph. The values of the parameters of a GUI event in transitioning from one GUI object to another may be modified and passed to the AUT to assess how the AUT responds. If the AUT does not transition to the expected GUI object, or does not transition to a GUI object indicating that an error condition has occurred, then the AUT may have a defect or security vulnerability. The specifications of the parameters may be determined using machine learning, so that, for instance, to determine how the parameters can be modified during GUI event-level fault-injection.

AUT testing based on the generated directed graph can further include testing the test flows themselves. Additional flows traversing the directed graph may be identified and added so that the AUT is more fully tested. For a specified set of test flows, whether any GUI objects and events are missing from these test flows can be identified and the specified set correspondingly modified so that they completely cover the AUT. For a specified set of test flows, redundancy in coverage of the GUI objects and events may instead be identified and the specified set modified to reduce such redundancy to make AUT testing more efficient.

FIG. 1 shows an example system 100 in which AUT testing can occur. The system 100 can include a host computing device 102, a client computing device 104, and a capture computing device 105 which are communicatively connected to one another via a network 106. The host computing device 102 may be a server or another type of computing device. The client computing device 104 may be a desktop, laptop, or another type of computer, a mobile computing device like a smartphone or a tablet computing device, and so on. The capture computing device 105 may also be a server or another type of computing device. The network 106 may be or include the Internet, intranets, extranets, local-area networks, wide-area networks, wireless networks, wired networks, telephony networks, and so on.

The host computing device 102 hosts an AUT 108. That is, the host computing device 102 at least partially runs or executes the AUT 108. The client computing device 104 may run a web browser 110 by which a user at the client computing device 104 interacts with the GUI of the AUT 108, and which may also partially run the AUT 108. For example, the AUT 108 may transmit a web page formatted in accordance with a markup language to the web browser 110, which responsively renders and displays the web page. Selection of a hyperlink by a user at the web browser 110 is transmitted back to the AUT 108, which may then transmit another web page, and so on.

In general, communication 112 resulting from interaction with the GUI of the AUT 108, such as user interaction via the web browser 110, is transmitted from the client computing device 104 over the network 106 to the host computing device 102. Similarly, responsive communication 114 from the AUT 108 back to the web browser 106 is transmitted from the host computing device 102 over the network 106 to the client computing device 104. Repeating of this process defines a test flow traversing the GUI of the AUT 108. The GUI of the AUT 108 may be traversed in numerous different ways, with corresponding such different test flows.

The capture computing device 105 captures, or intercepts, the communication 112 from the client computing device 104 to the host computing device 102 over the network 106.

Similarly, the capture computing device 105 captures, or intercepts, the responsive communication 114 to the client computing device 104 over the network 106. The capture computing device 105 may execute a protocol analyzer, and other types of software, to analyze the intercepted communications 112 and 114, consistent with the approaches described later in the detailed description.

Other implementations can differ from that shown in FIG. 1. The host computing device 102 and the client computing device 104 may be directly connected to one another, instead of via a network 106. The client computing device 104 may access the AUT 108 in a way other than by usage of a browser 110, such as via a native application or "app" running on the client computing device 104 that interacts with can partially run the AUT 108. The host computing device 102 and the client computing device 104 may be the same computing device. In such an implementation, there may or may not be a browser 110. For example, the AUT 108 may display its GUI and directly receive user interaction with the GUI without usage of a browser 110.

Figure 2:
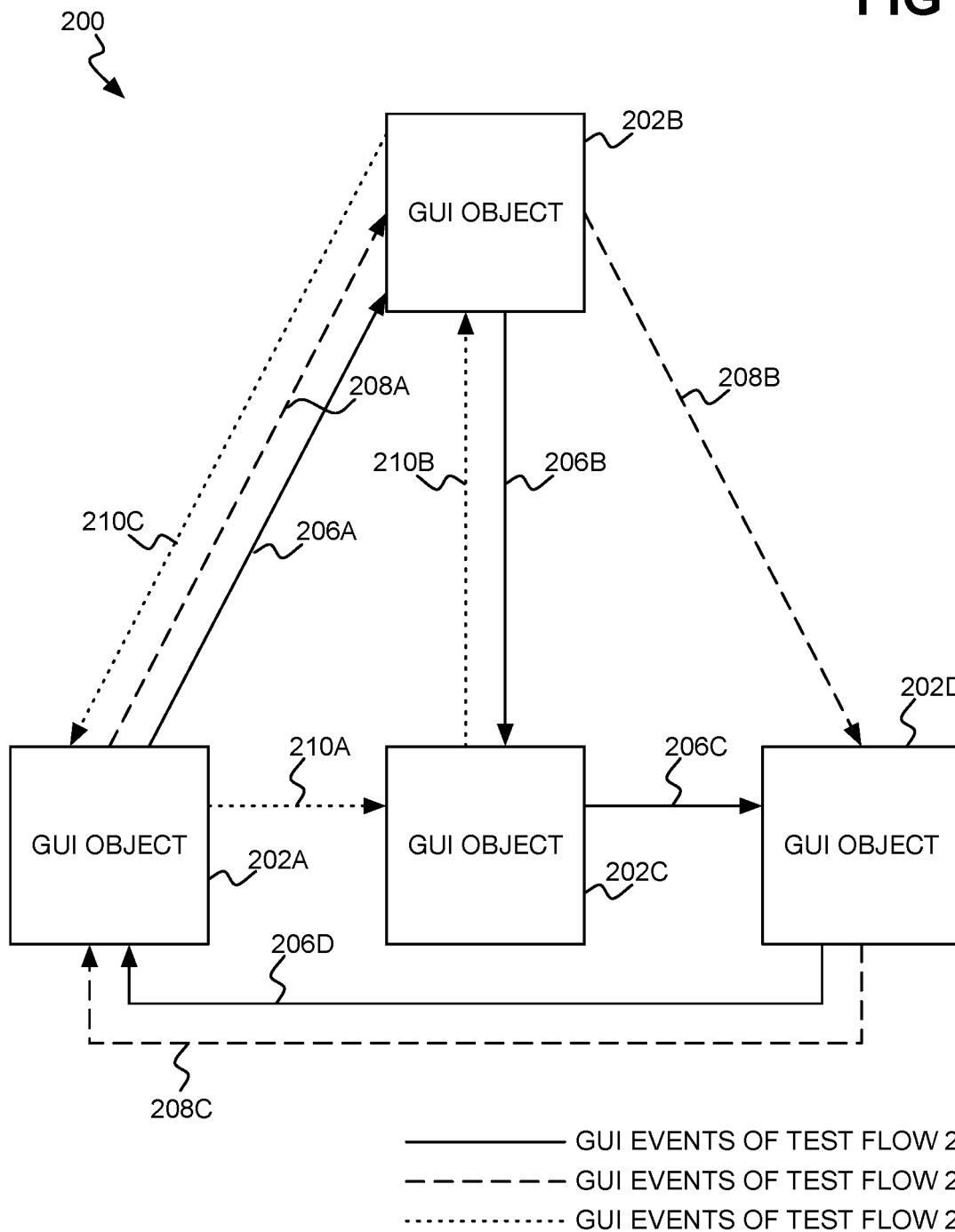
FIG. 2 is a diagram of an example graphical user interface (GUI) of an AUT.

FIG. 2 diagrammatically depicts representation of an example GUI 200 of an AUT. The GUI 200 includes GUI objects 202A, 202B, 202C, and 202D, which are collectively referred to as the GUI objects 202. Four GUI objects 202 are shown in the example of FIG. 2, but there are likely to be many more such GUI objects 202 in actuality. A GUI object 202 can be a window or another type of view, in a given state. Different states of the same window are different GUI objects 202. For example, a window can include a number of differently arranged GUI elements like check boxes, buttons, text boxes, and other types of GUI elements. Selection or actuation of a GUI element of a window may result in the window as displayed being modified and thus enter a different state, or can result in a different window being displayed. In either case, a new GUI object or new view of the GUI is displayed.

Three different traversals through the GUI 200 are depicted in the example of FIG. 2, which are the test flows 204A, 204B, and 204C, collectively referred to as the test flows 204. Each test flow 204 defines a traversal sequence of the GUI objects 202 of the GUI 200 via GUI events. A GUI event is associated with each transition from one GUI object 202 to another GUI object 202, and represents the user interaction with the GUI 200 that results in this transition. For example, the user interaction may be in the form of selection of a GUI element of one GUI object 202, which results in transition to another GUI object 202, which as noted above may be the same window or view but in a different state, or an entirely different window or view.

As also noted above, the user interaction may be at a web browser of a client computing device communicatively connected to a host computing device hosting the AUT. A GUI event can thus encompass the values of parameters passed within the communication from the client computing device to the host computing device that occurred responsive to the user interaction that resulted in the transition represented by the GUI event. As one example, the parameters may be specified according to a transport protocol, such as PUT and GET parameters within the hypertext transport protocol (HTTP) that identify which GUI element has been selected on a GUI object 202, as well as that identify other data.

The test flow 204A includes traversal of the GUI objects 202 via GUI events 206A, 206B, 206C, and 206D, which are collectively referred to as the GUI events 206, and which are depicted in FIG. 2 as solid lines. From the GUI object 202A, user interaction with the GUI 200 results in transition to the GUI object 202B, as represented by the GUI event 206A. From the GUI object 202B, user interaction represented by the GUI event 206B results in transition to the GUI object 202C, and user interaction represented by the GUI event 206C results in transition to the GUI object 202D. From the GUI object 202D, user interaction with the GUI 200 results in transition back to the GUI object 202A, per the GUI event 206D.

The test flow 204B includes traversal of the GUI objects 202 via GUI events 208A, 208B, and 208C, which are collectively referred to as the GUI events 208, and which are depicted in FIG. 2 as dashed lines. From the GUI object 202A, user interaction with the GUI 200 results in transition to the GUI object 202B, as represented by the GUI event 208A. The GUI event 208A can be the same GUI event (or a different GUI) as the GUI event 206A, but is depicted separately in FIG. 2 for illustrative clarity. From the GUI object 202B, user interaction represented by the GUI event 208B results in transition to the GUI object 202D, and user interaction represented by the GUI event 208C (which can be the same GUI event (or a different GUI event) as the GUI event 206D) results in transition back to the GUI object 202A. The test flow 204B thus does not traverse the GUI object 202C.

The test flow 204C includes traversal of the GUI objects 202 via GUI events 210A, 210B, and 210C, which are collectively referred to as the GUI events 210, and which are depicted in FIG. 2 as dotted lines. From the GUI object 202A, user interaction with the GUI 200 results in transition to the GUI object 202C, as represented by the GUI event 210A. From the GUI object 202C, user interaction represented by the GUI event 210B results in transition to the GUI object 202B. From the GUI object 202B, user interaction with the GUI 200 results in transition back to the GUI object 202A, per the GUI event 210C. The test flow 204C thus does not traverse the GUI object 202D.

Figure 3:
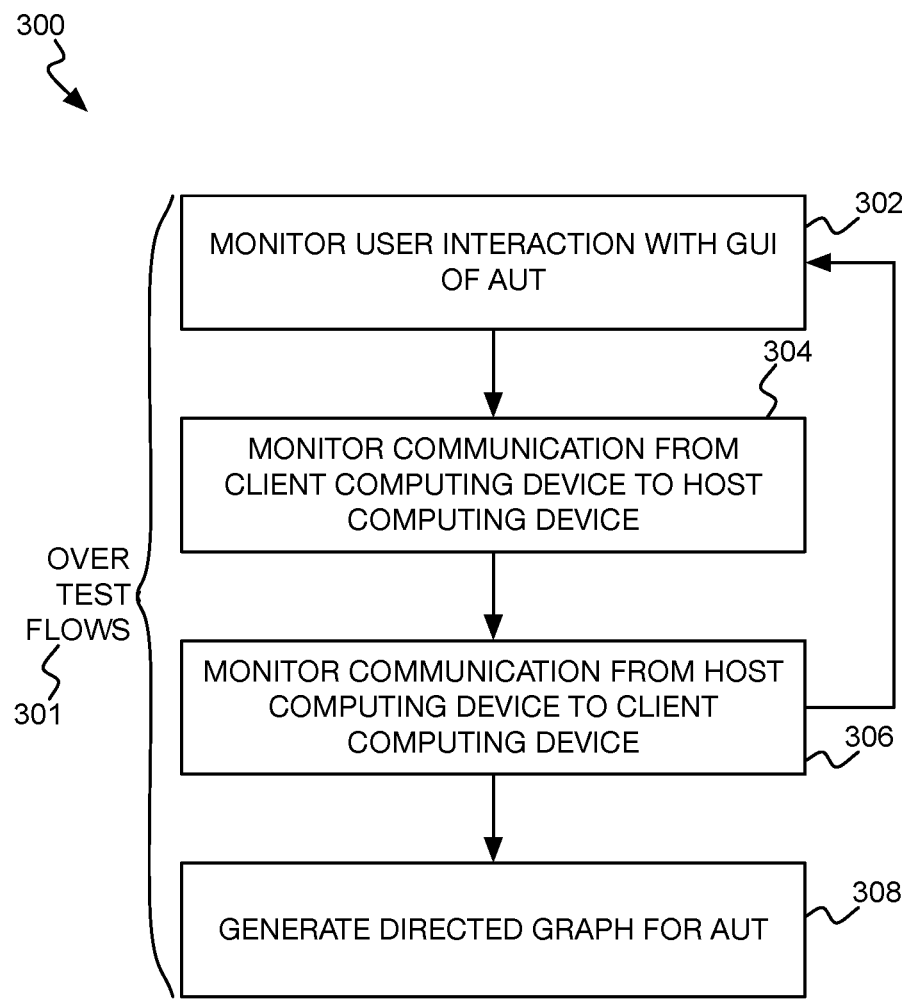
FIG. 3 is a flowchart of an example method for generating a directed graph for an AUT.

FIG. 3 shows an example method 300 of an overall approach for generating a directed graph for an AUT. The method 300 can be implemented as program code stored on a non-transitory computer-readable data storage medium, and executable by a processor of a computing device. A computing device can perform the method 300. For instance, with respect to the example system of FIG. 1, the computing device may be an additional computing device, different from the host computing device 102 and the client computing device 104. In another implementation, the computing device may be either or both of the computing devices 102 and 104, in lieu of or in addition to an additional computing device.

For example, an additional computing device may monitor network communication between the host computing device 102 and the client computing device 104 over the network 106. Such network communication may instead be monitored by just the host computing device 102, as to incoming communication from and outgoing communication to the client computing device 104. Similarly, such network communication may instead be monitored by just the client computing device 104, as to incoming communication from and outgoing communication to the host computing device 102. As another example, just incoming or outgoing communication may be monitored at each computing device 102 and 104.

The method 300 is performed over all the test flows traversing the GUI of the AUT (301), as the test flows are performed. That is, when a tester or other user traverses the GUI of the AUT in accordance with a test flow, the method 300 is performed to generate the directed graph for the AUT.

The method 300 may generate the directed graph as the GUI of the AUT is traversed in accordance with a test flow, or once all the test flows have been performed. The test flows may in one implementation not be known a priori, and instead are defined as a user traverses the GUI of the AUT.

The method 300 thus includes monitoring user interaction at the client computing device with the GUI of the AUT hosted by the host computing device (302). Monitoring such user interaction can include detecting which GUI element of a current GUI object of the AUT has been actuated or selected to cause transition to another GUI object of the AUT, and then detecting the latter GUI object. This process is repeated as GUI elements are selected to transition among the GUI objects of the AUT, to detect the GUI objects and to detect the GUI events associated with the transitions among the GUI objects.

The method 300 includes monitoring communication from the client computing device to the host computing device (304) and can also include monitoring responsive communication from the host computing device to the client computing device (306). In one implementation, parts 302/304/306 of the method 300 can be implemented as described in pending PCT patent application, "representation of user interface interactive regions," filed on Feb. 25, 2019, and assigned application no. PCT/CN2019/076040 and U.S. patent application Ser. No. 16/802,875 "Backend Application Load Testing with Respect to Session between Client Application and Service," filed Feb. 27, 2020, which are both incorporated herein by reference. For each GUI event that is detected via monitoring the user interaction at the client computing device with the GUI of the AUT, the communication between the client computing device and the host computing device can be responsively recorded. For example, each time a user selection or actuation of a GUI element of a current GUI object has been detected and that results in transition to a different GUI object, which is also detected, this communication can be recorded.

The communication from the client computing device to the host computing device can include values of parameters that are passed from the client computing device to the host computing device to cause a transition from the current GUI object to a different GUI object. The GUI event associated with this transition is said to encompass these parameter values. In one implementation, if the user interaction with the GUI of the AUT is not directly monitored to detect a transition, the user interaction may be indirectly monitored based on the monitored communication from the client computing device to the host computing device. For example, when communication from the client computing device to the host computing device is detected that pertains to the AUT, it may be concluded that this communication corresponds to a requested transition from the current GUI object to a different GUI object.

The communication from the host computing device back to the client computing device may include or specify the different GUI object that has been transitioned to as a result of the user interaction with the GUI of the AUT. In one implementation, if the user interaction is not directly monitored to detect when a different GUI object has been displayed at the client computing device, such user interaction may be indirectly monitored based on the monitored communication from the host computing device to the client computing device (e.g., in a similar manner as described in the previous paragraphs). For example, when communication from the host computing device to the client computing device is detected that pertains to the AUT, it may be concluded that this communication corresponds to a different GUI object that has been transitioned to. The process of steps 302-306 is then continually repeated during the testing of the user interface.

The method 300 includes generating a directed graph for the AUT based on the user interaction with the GUI of the AUT and the communication between the client and host computing devices as have been monitored (308). The directed graph can be dynamically generated as the user interaction and the communication occurs (i.e., as test flows traversing the GUI of the AUT are performed). The directed graph can instead be generated once all such user interaction and the communication have occurred (i.e., once a set of test flows traversing the GUI of the AUT have been performed). A specific approach by which the directed graph for the AUT can be generated is described later in the detailed description.

In general, however, a directed graph is generated that includes nodes interconnected by directed edges. The nodes correspond to the GUI objects of the AUT that have been traversed by the test flows, with each node representing a corresponding GUI object and each GUI object represented by just one node. The directed edges correspond to the GUI event of the AUT. Each GUI event is associated with a transition from one GUI object to another GUI object as traversed by the test flows, and encompasses the values of the parameters passed within the communication from the client computing device to the host computing device that occurred responsive to the user interaction that resulted in the transition. Each edge represents a corresponding GUI event and each GUI event is represented by just one edge.

Figure 4:
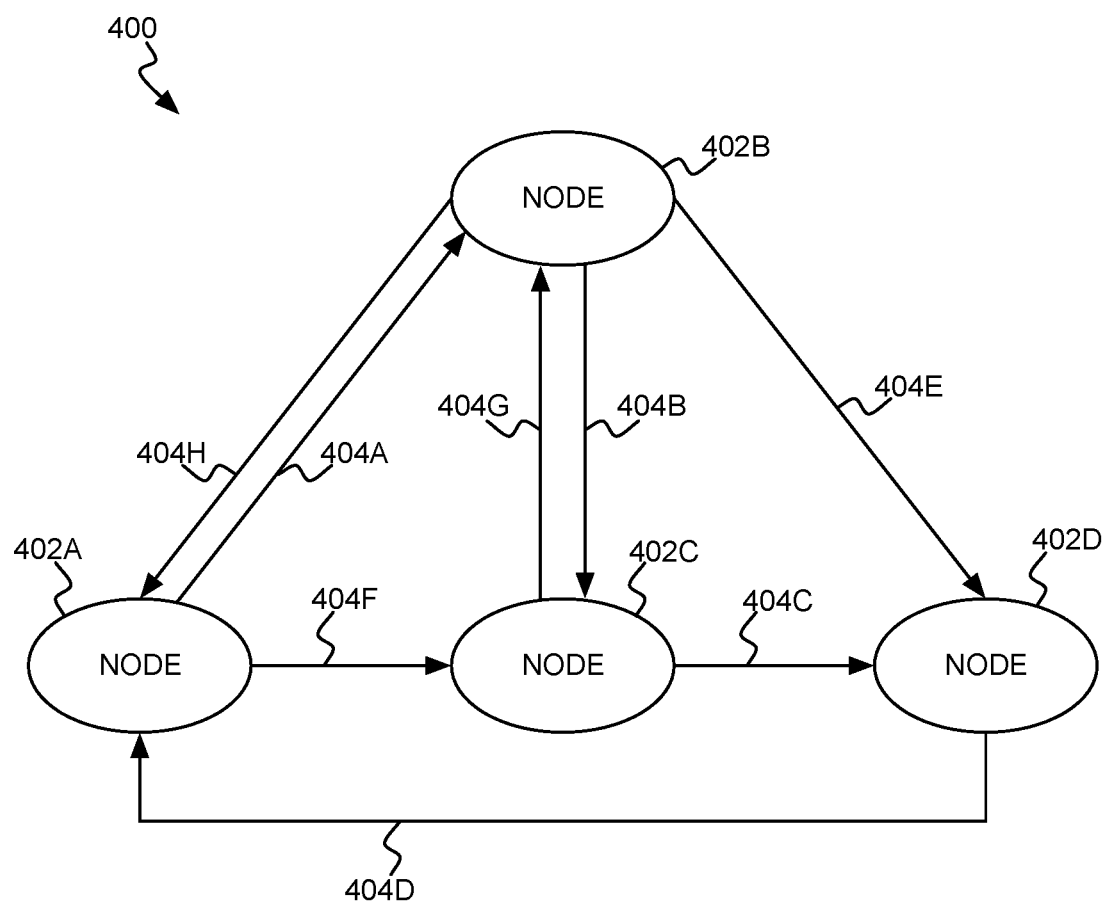
FIG. 4 is a diagram of an example directed graph for an AUT.

FIG. 4 shows an example directed graph 400 that can be generated for an AUT having the GUI 200 of FIG. 2. The directed graph 400 includes four nodes 402A, 402B, 402C, and 402D, which respectively correspond to the GUI objects 202A, 202B, 202C, and 202D of FIG. 2, and which are collectively referred to as the nodes 402. The directed graph includes directed edges 404A, 404B, 404C, 404D, 404E, 404F, 404G, and 404H, which are collectively referred to as the directed edges 404. Each edge 404 directionally connects one GUI object 202 with another GUI object 202, and the directional nature of this connection is why each edge 404 is a directed edge.

The edge 404A connects the node 402A to the node 402B, and corresponds to the GUI event(s) 206A/208A associated with the transition from the GUI object 202A to the GUI object 202B in FIG. 2. The edge 404B connects the node 402B to the node 402C, and corresponds to the GUI event 206B associated with the transition from the GUI object 202B to the GUI object 202C in FIG. 2. The edge 404C connects the node 402C to the node 402D, and corresponds to the GUI event 206C associated with the transition from the GUI object 202C to the GUI object 202D in FIG. 2. The edge 404D connects the node 402D to the node 402A, and corresponds to the GUI event 206D/208C associated with the transition from the GUI object 202D back to the GUI object 202A in FIG. 2.

The edge 404E connects the node 402B to the node 402D, and corresponds to the GUI event 208B associated with the transition from the GUI object 202B to the GUI object 202D in FIG. 2. The edge 404F connects the node 402A to the node 402C, and corresponds to the GUI event 210A associated with the transition from the GUI object 202A to the GUI object 202C in FIG. 2. The edge 404G connects the node 402C to the node 402B, and corresponds to the GUI event 210B associated with the transition from the GUI object 202C to the GUI object 202B in FIG. 2. The edge 404H connects the node 402B to the node 402A, and corresponds to the GUI event 210C associated with the transition from the GUI object 202B back to the GUI object 202A in FIG. 2.

FIG. 5 shows an example method 500 for generating a directed graph for an AUT. Like the method 300, the method 500 can be implemented as a non-transitory computer-readable data storing program code executable by a processor of a computing device. The method 500 is repeatedly performed as user interaction with the GUI of the AUT occurs. That is, each time a user causes the AUT to transition from a current GUI object to another GUI object via interaction with the GUI of the AUT, the method 500 is performed. The user interaction with the GUI can be detected as has been described above in relation to the method 300, as can the communication between the client computing device at which the user interaction occurs and the host computing device hosting the AUT.

The method 500 assumes that the first time the GUI of the AUT is accessed, a directed graph is instantiated for the AUT with a single node, corresponding to the starting GUI object of the GUI. The method 500 then begins when the user interacts with the GUI to cause the AUT to transition from this GUI object to another GUI object of the GUI. The method 500 is performed, then, each time the user interacts with the GUI to cause the AUT to transition from a current GUI object to a new GUI object. The method 500 may be performed as a test flow is performed—i.e., as the user interacts with the GUI of the AUT—or afterwards.

The method 500 includes detecting a transition from the current GUI object of the AUT to a new GUI object of the AUT (502), as caused by user interaction with the GUI of the AUT (e.g., by recording the data sent from the client computing device 110 to the host computing device 102). In response to determining that the directed graph does not have a node for the new GUI object (504), the method 500 includes adding a new node to the directed graph corresponding to the new GUI object (506), and adding a new edge from the node of the directed graph corresponding to the current GUI object to the node representing the new GUI object (508). The newly added edge corresponds to the GUI event associated with the transition from the current GUI object to the new GUI object, where this GUI event encompasses the values of the parameters passed from the client computing device to the host computing device to cause the transition. The method 500 is then finished (510).

However, in response to determining that the directed graph already has a node for the new GUI object (504), the method 500 includes determining whether the directed graph has an edge from the node corresponding to the current GUI object to this existing node corresponding to the new GUI object. In response to determining that the directed graph does not have an edge from the node corresponding to the current GUI object to the node corresponding to the new GUI object (512), the method 300 includes adding a new edge from the former node to the latter node (508), as described in the previous paragraph, which completes the method 500 (510). However, in response to determining that the directed graph already has an edge from the node corresponding to the current GUI object to the node corresponding to the new GUI object (512), the method 300 finishes without adding either a new node or a new edge (510).

As has been described, the directed graph for the AUT is generated based on test flows that traverse the GUI of the AUT. No direct analysis of any source code for the AUT is therefore necessary to generate the directed graph. Instead, the analysis is done indirectly based on the data sent (which can actually be code, such as HTML/JavaScript) to and from the client computing device and the host computing device. Furthermore, the directed graph is automatically generated, without the user having to manually construct the directed graph. Rather, nodes are added to the directed graph as previously untraversed GUI objects of the AUT are traversed by the test flows. Similarly, edges are added to the directed graph as the test flows newly transition among the GUI objects, in correspondence with GUI events associated with such transitions.

However, this means that the generated directed graph just includes nodes for test flow-traversed GUI objects and edges for test flow-traversed GUI events. The AUT may, though, include other GUI objects and GUI events, which were not traversed by the test flows. Generation of the directed graph as has been described, in other words, may be restricted to nodes and edges being added just for those GUI objects and GUI events, respectively, which have specifically been traversed by the test flows.

FIG. 6 diagrammatically depicts representation of an example GUI 200' of an AUT having such untraversed GUI objects and GUI events. The GUI 200' includes the same GUI objects 202 and GUI events 206, 208, and 210 as the GUI 200 of FIG. 2 on which basis the directed graph 400 of FIG. 4 was generated. However, the GUI 200' also includes GUI events 602, 606, and 608 and a GUI object 604 that have not been traversed by any test flows. Therefore, generation of the directed graph 400 of FIG. 4 in the manner that has been described does not result in corresponding edges being added to the graph 400 for the GUI events 602, 606, and 608, nor a corresponding node being added for the GUI object 604.

The untraversed GUI event 602 is associated with the transition from the traversed GUI object 202A to the traversed GUI object 202D. While there is a GUI event 206D/208C associated with a test flow-traversed transition from the GUI object 202D to the GUI object 202A and thus which is represented by an edge in the directed graph 400 of FIG. 4, the GUI event 602 is associated with the reverse or opposite transition for which there is no edge in the graph 400. The GUI object 604 is an untraversed GUI object of the GUI 200'. The untraversed GUI event 606 is associated with the transition from the traversed GUI object 202B to the untraversed GUI object 604, and the untraversed GUI event 608 is associated with the transition from the untraversed GUI object 604 to the traversed GUI object 202D.

FIGS. 7, 8, and 9 respectively show different example methods 700, 800, and 900 for identifying untraversed GUI objects and GUI events within an AUT, so that corresponding nodes and edges can be added to the directed graph already generated for the AUT. As with the prior methods that have been described, the methods 700, 800, and 900 can each be implemented as a non-transitory computer-readable data storage medium storing program code executable by a computing device. The methods 700, 800, and 900 can be used individually or in combination with one another.

The method 700 of FIG. 7 includes directly analyzing source code for the AUT to detect any GUI objects and GUI events that were not traversed by the test flows on which basis the directed graph has already been generated (702). As such, whereas the directed graph can be initially generated without any direct AUT source code analysis, the method 700 then supplements the resultantly generated directed graph via subsequent direct analysis of source code for the AUT. The source code may be specified in an object-oriented programming language like Java, C++, or C# programming language, among other types of object-oriented programming languages, or another type of programming language. The source code may be web based code, such as JavaScript, Hyper Text Markup Language (HTML), and/or the like.

For example, in an object-oriented programming language, when a GUI object like a window is constructed, GUI elements like menus, buttons, text boxes, hyperlinks, and so on, which are a part of the GUI object are defined. There may be methods associated with such GUI elements. For example, a Java button element may have an "addAction-Listener" method that is called when the element is selected. When this method is called, it can open another GUI object, such as a different window or a different view of the same window. The source code of each event listener method of each GUI object may be parsed to identify additional GUI objects and their associated event listeners.

The method 700 can therefore in one implementation can automatically add new nodes to the directed graph for any GUI objects that have been identified and that do not already have corresponding nodes, and new edges for any GUI events that have been identified and that do not already have corresponding edges in the graph (704). Such GUI objects and GUI events that do not already have respective corresponding nodes and edges in the directed graph are untraversed GUI objects and untraversed GUI events. An untraversed GUI event in the case of the method 700 is associated with the transition that would result from selection of a GUI element, like a Java button element, from a traversed or untraversed GUI object to another GUI object, which similarly may be a traversed or an untraversed GUI object.

The method 800 of FIG. 8 includes analyzing the monitored communication between the client computing device and the host computing device to detect any GUI objects and GUI events that were not traversed by the test flows on which basis the directed graph has already been generated (802). As such, the directed graph can be generated in the manner that has been described, with the method 800 then supplementing the resultantly generated directed graph via further analysis of the communication between the client computing device and the host computing device that was monitored in the method 300 of FIG. 3. The communication may be analyzed after the test flows have already been performed, or may be analyzed as the test flows are performed.

For example, when a new GUI object is specified in the communication from the host computing device back to the client computing device responsive to user interaction with a current GUI object, the new GUI object may include GUI elements, as noted above. Selection of a GUI element can result in transition to yet another GUI object, which may or may not have been traversed by the test flows. If a GUI element was not selected in any of the test flows, such an unselected GUI element may mean there is an untraversed GUI event associated with a transition to an untraversed or already traversed GUI object. Therefore, by analyzing the communication, untraversed GUI events and GUI objects can be identified and displayed to the user as an untraversed GUI object(s)/GUI event(s). For example, the untraversed GUI object(s)/GUI event(s) may be displayed in a different color to the user to alert the user that the untraversed GUI objects still need to be tested.

As in the method 700 of FIG. 7, the method 800 can, in one implementation, automatically add new nodes to the directed graph for any GUI objects that have been identified and that do not already have corresponding nodes, and new edges for any GUI events that have been identified and that do not already have corresponding edges in the graph (804).

Such GUI objects and GUI events that do not already have respective corresponding nodes and edges in the directed graph are untraversed GUI objects and untraversed GUI events. An untraversed GUI event in the case of the method 800 is associated with the transition that would result if a GUI element from a traversed GUI object to another GUI object had been selected, where the latter GUI object may be a traversed or an untraversed GUI object.

In the example methods 700 and 800 of FIGS. 7 and 8, new nodes and new edges are automatically added to the directed graph for any untraversed GUI objects and GUI events that have been identified. However, in another implementation, new nodes and new edges may not automatically be added. Rather, the user may be suggested to select GUI elements of GUI objects that correspond to untraversed GUI events, which may then transition to already traversed or untraversed GUI objects. This implementation is shown in the method 900 of FIG. 9.

The method 900 of FIG. 9 includes detecting an untraversed GUI event (902). The untraversed GUI event may be detected based on source code analysis, per the method 700 of FIG. 7, or based on host computing device-client computing device communication analysis, per the method 800 of FIG. 8. While the user is interacting with the GUI of the AUT in accordance with a test flow, the method 900 can include then suggesting to the user that he or she select a GUI element corresponding to the untraversed GUI event (904).

Such suggestion occurs when the GUI object including the GUI element in question is the current GUI object, and therefore the GUI element is selectable by the user. Such suggestion can be achieved by highlighting the GUI element as displayed at the client computing device at which user interaction with the GUI of the AUT is occurring, for instance. If the user selects the GUI element, a new edge for the corresponding—and now traversed—GUI event is added to the directed graph as has been described above in relation to the methods of FIGS. 3 and 5. If the GUI event is associated with a transition to a GUI object that was not previously traversed, a corresponding node is likewise added to the directed graph for the GUI object.

As has been described, GUI events for which edges are added to the directed graph for an AUT each encompass the values of the parameters passed to the AUT in transitioning from one GUI object to another. The values of the parameters encompassed by a GUI event can be determined from the monitored communication from the client computing device at which user interaction of the GUI of the AUT occurs to the host computing device hosting the AUT. More specifically, the values of the parameters encompassed by a GUI event can be determined from the communication from the client computing device to the host computing device that results from the user interaction with the GUI of the AUT which causes the AUT to transition from one GUI object to another.

However, it may be difficult to identify the names of the actual parameters and other aspects of the specifications of the parameters, particularly in an implementation in which source code for the AUT is not directly analyzed to generate the directed graph. The specifications of the parameters can include the value types of the parameters, such as integer, text, Boolean, and so on, for instance, as well as permissible values of the parameters. A parameter may have fields, some of which may be required and others of which may be optional and thus not always passed when transitioning from one GUI object to another. While the values of the parameters encompassed by a GUI event can in some if not most or even all cases be ascertained just from the monitored communication from the client computing device to the host computing device, it is not out of the question that full specifications of the parameters may not be ascertainable from just monitored communication.

FIG. 10 shows an example method 1000 for identifying the specifications of parameters for which values are passed to the AUT in transitioning between GUI objects. Like the previously described methods, the method 1000 can be implemented as a non-transitory computer-readable data storage medium storing program code executable by a computing device. The method 1000 includes performing machine learning to identify the specifications of parameters for which values are passed to the AUT in transitioning between GUI objects (1002). That is, for each GUI event, the specifications of the parameters for which values are passed in the transition associated with the GUI event, from one GUI object to another GUI object, can be determined in a machine learning manner.

In one implementation, a machine learning model can be trained using source code of a number of different AUTs and corresponding GUI objects/GUI events. Machine learning is then applied to identify parameters based on learned formats that are produced by different types of source code. Based on the learned source code analysis, similar patterns can be associated with different types of GUI events. For example, the machine learning model may learn over time that specific parameters occur for specific types of GUI events. As noted above, a GUI object may expose different GUI elements that when selected cause transition to other GUI objects via calling of methods associated with the GUI elements. Different such GUI elements may have different signatures that can be learned over time.

As an example, when a Java GUI element like a button is selected, the output may have a specific signature that can be learned over time. A value for a particular parameter may be passed when the button is selected at a specific position. From a screen image capture that may occur when monitoring user interaction of the GUI of the AUT, a particular selection of the button can be detected and then the signature sent within the communication from the client computing device to the host computing device analyzed, so as to over time learn that a specific type of GUI event has occurred. This process can be performed for different known types of GUI elements exposed by a GUI object and that selection of which results in transition from the GUI object to another GUI object.

The machine learning model may also or instead be trained from the communication between the client computing device and the host computing device when transitioning between GUI objects of the AUT. For example, non-text fields of parameters, such as session identifiers, may be learned over time in this manner. The machine learning model may detect that a session identifier is first created when a test flow is started, and remains the same until the test flow has been captured. Other fields may be identified using similar machine learning based on messages that are created in relation to the GUI events that are occurred. As one example, when the user selects a GUI element of a GUI object pertaining to selecting a file, the GUI event can be correlated with a file identifier that can be learned. For text-based markup languages and protocols, the parameters may be more easily identified, since they are in text form.

FIG. 11 shows an example method 1100 for performing testing of an AUT based on a directed graph for the AUT. Therefore, once the directed graph for the AUT has been generated as has been described, the AUT can be tested using the directed graph. Like the other methods that have been described, the method 1100 can be implemented as a non-transitory computer-readable data storage medium storing program code executable by a computing device. The method 1100 can include performing one or more of three different types of AUT testing using the directed graph (1102).

Specifically, the method 1100 can include performing GUI event-level debugging of the AUT, in a step-by-step manner or using breakpoints (1104). In general, GUI event-level debugging permits a tester to inspect the parameters passed to the AUT in transitioning from one GUI object to another, as encompassed by a corresponding GUI event. The method 1100 can also or instead include performing GUI event-level fault-injection testing of the AUT (1106). In general, GUI event-level fault-injection testing permits a tester to modify the parameters passed to the AUT in transitioning from one GUI object to another to assess how the AUT responds.

The method 1100 can also or instead including analyzing test flows, such as those on which basis the directed graph for the AUT was generated, to assess coverage of the GUI of the AUT by the test flows (1108). The test flows can be analyzed to assess AUT GUI coverage in a number of different ways. For instance, the test flows can be analyzed to identify additional, different test flows that traverse the GUI. A specified set of the test flows can be analyzed to assess whether they cover all GUI objects and GUI events of the AUT. A specified set of the test flows can be analyzed to assess redundancy in the traversal of the AUT's GUI objects and GUI events by these test flows.

The different types of AUT testing of the method 1100 are now each described in detail. However, the method 1100 can include other types of AUT testing based on the directed graph, in addition to or in lieu of those shown in FIG. 11. In general, the types of AUT testing depicted in FIG. 11 use the directed graph for the AUT to test the AUT at a higher level than testing AUT source code, for instance. Such higher level testing can permit testing of the overall functionality of the AUT to be more efficiently and quickly performed than having to granularly inspect or analyze the source code of the AUT.

Figure 12:
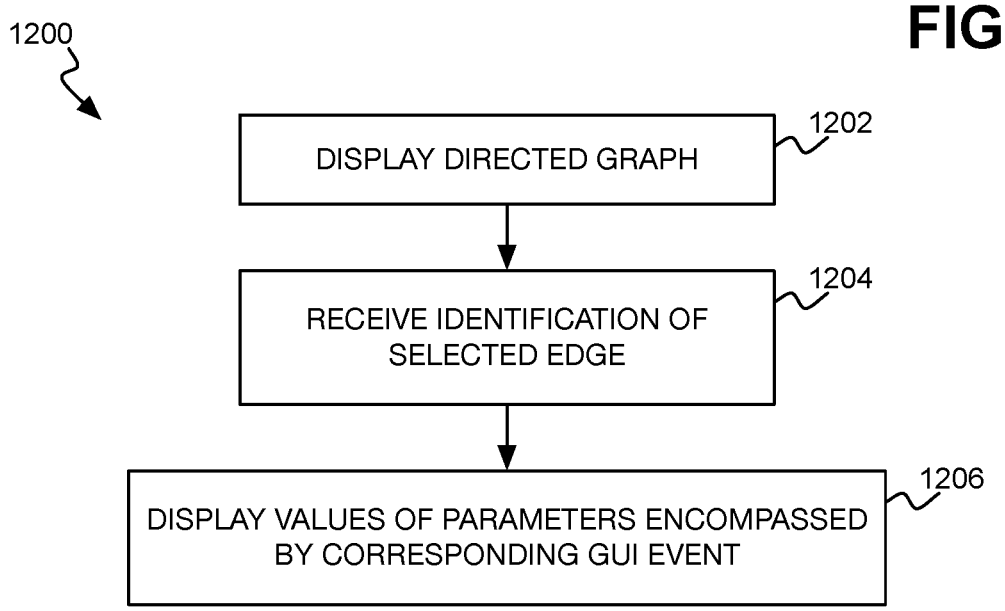
FIG. 12 is a flowchart of an example method for performing GUI event-level debugging of an AUT, in a step-by-step manner, based on a directed graph for the AUT.

FIG. 12 shows an example method 1200 for performing GUI event-level debugging of an AUT in a step-by-step manner, based on the directed graph for the AUT, as well as the data between the host and client computing devices that has been recorded. The method 1200, as with the other methods that have been described, can be implemented as program code stored on a non-transitory computer-readable data storage medium and executed by a processor of a computing device. The method 1200 can include displaying the directed graph for the AUT that has been generated (1202). Displaying the directed graph can include displaying the actual graph, such as the directed graph 400 of FIG. 4 for an AUT, or the representation of the GUI of the AUT to which the graph corresponds, such as the representation of the GUI 200 of FIG. 2 to which the graph 400 corresponds.

The method 1200 can include receiving identification of a selected edge of the directed graph (1204). For example, a tester may navigate (e.g., by single stepping) the directed graph as has been displayed, and select an edge of interest by hovering a mouse pointer over the edge, by positioning the mouse pointer over the edge and clicking a mouse button, and so on. The method 1200 can include in response displaying the values of the parameters encompassed by the GUI event corresponding to the selected edge (1206). These parameters values are the values of the parameters that were collected when monitoring/recording the communication from the client computing device to the host computing device when the directed graph was generated.

That is, the method 1200 may not involve any additional performance of test flows against the AUT. Rather, the method 1200 may instead just display the parameter values collected when the test flows were previously recorded, on which basis the directed graph was generated. However, in another implementation, the method 1200 can include subsequently passing or submitting the displayed parameter values to the AUT, after causing the AUT to reach the GUI object at which the GUI event corresponding to the selected edge is to occur.

Figure 13:
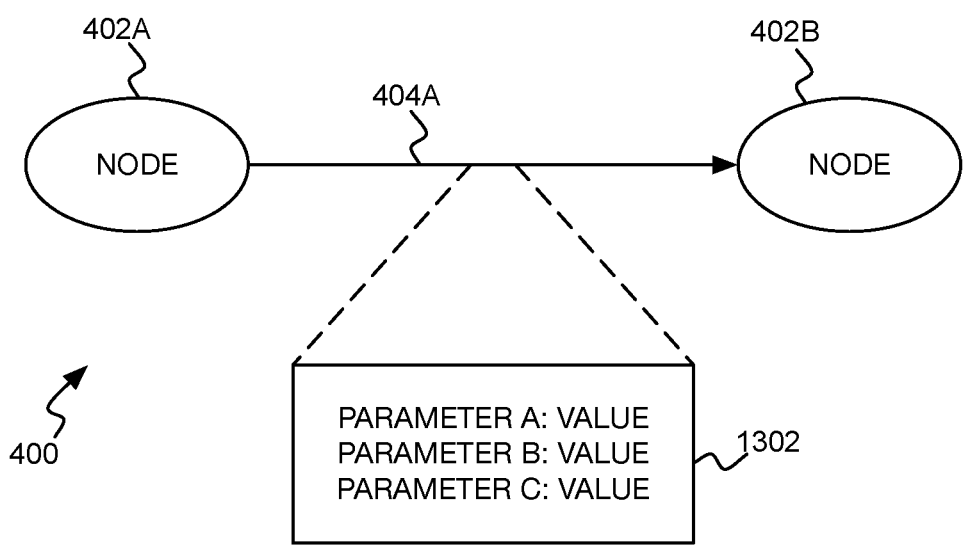
FIG. 13 is a diagram illustrating example performance of the method of FIG. 12.

FIG. 13 illustratively depicts example performance of the method 1200. A portion of the directed graph 400 of FIG. 4 is shown in FIG. 13. Specifically, FIG. 13 shows the nodes 402A and 402B of the directed graph 400, as interconnected by the directed edge 404A from the node 402A to the node 402B. In the example of FIG. 13, the tester has selected the edge 404A. Therefore, parameter values 1302 are responsively displayed. The parameter values 1302 are the recorded values of the parameters that were passed to the AUT in transitioning from the GUI object corresponding to the node 402A to the GUI object corresponding to the node 402B. The GUI event associated with this transition, and which corresponds to the edge 404A, encompasses these parameter values 1302.

Figure 14:
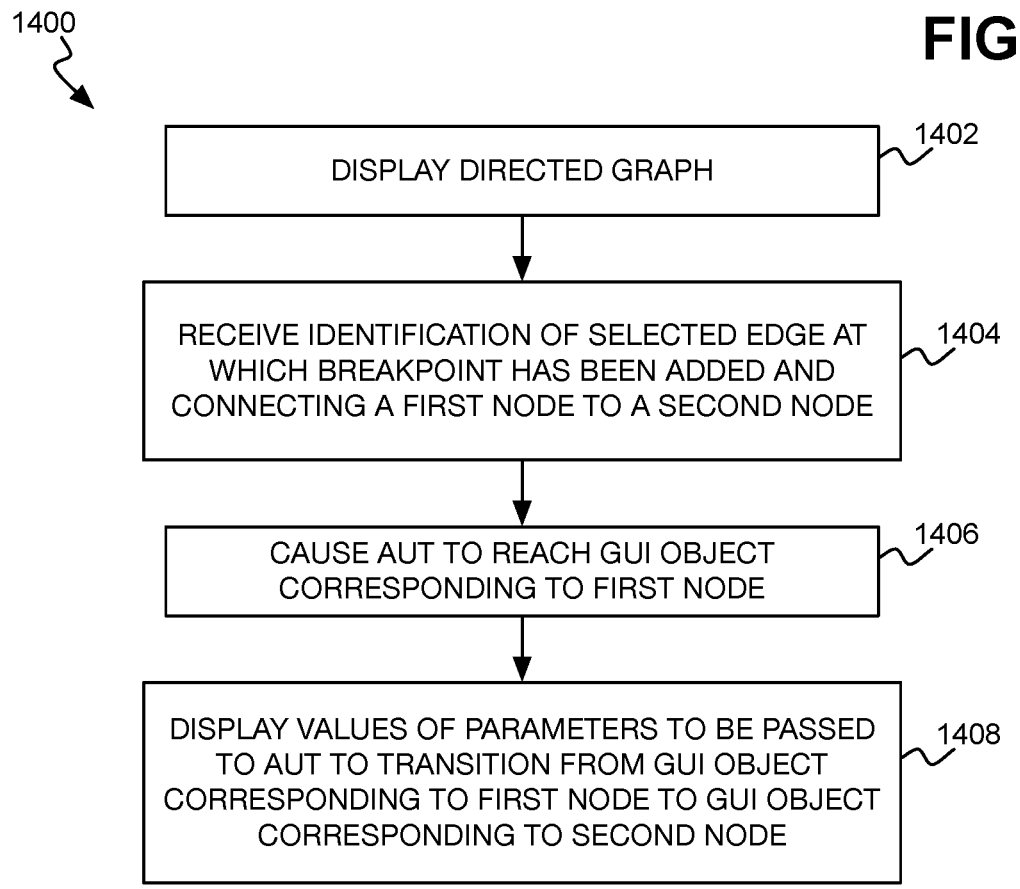
FIG. 14 is a flowchart of an example method for performing GUI event-level debugging of an AUT, using one or more breakpoints, based on a directed graph for the AUT.

FIG. 14 shows an example method 1400 for performing GUI event-level debugging of an AUT using one or more breakpoints, based on the directed graph for the AUT. As with the previously described methods, the method 1400 can be implemented as program code stored on a non-transitory computer-readable data storage medium and executed by a processor of a computing device. The method 1400 can include displaying the directed graph for the AUT that has been generated (1402). As in the method of FIG. 12, displaying the directed graph can include displaying the actual graph itself, or the representation of the GUI of the AUT to which the graph corresponds.

The method 1400 can include receiving identification of a selected edge at which a breakpoint has been added (1404). The selected edge connects a first node (node 402C in this example) of the directed graph to a second node (node 402D in this example) of the graph. A breakpoint is an intentional stopping or pausing of execution of the AUT, and thus stopping or pausing of the recorded data between the client and host computing devices. Therefore, a tester can place a breakpoint at a selected edge so that, when the AUT is subsequently tested by performing a test flow that includes the GUI event corresponding to the selected edge, AUT execution and transmission of the recorded data stop at the GUI object corresponding to the first node. That is, the GUI event corresponding to the selected edge is not performed, meaning that the parameter values encompassed by this GUI event are not passed to the GUI object corresponding to the first node once the AUT reaches this GUI object.

The method 1400 can include responsively causing the AUT to reach the GUI object corresponding to the first node that the selected edge directly connects to the second node (1406). For instance, the method 1400 may identify one of the test flows on which basis the directed graph was generated that includes the GUI event including the selected edge. The method 1400 then performs the test flow until the AUT reaches the GUI object corresponding to the first node. That is, the method 1400 sequentially passes the parameter values of the GUI events traversed by the test flow, to cause the AUT to transition the GUI objects traversed by the test flow in the order in which the test flow traverses them, until the AUT has reached the GUI object corresponding to the first node.

In testing the AUT in this way, the method 1400 does not have to actually display or even render any of the GUI objects. Rather, at a current GUI object of the AUT, the method 1400 passes to the AUT the parameter values encompassed by the recorded GUI event that causes the AUT to transition to the next GUI object of the test flow. When the method 1400 responsively receives communication back from the AUT corresponding to the next GUI object, the method 1400 passes the parameter values encompassed by the next GUI event.

This process is thus repeated until the AUT reaches the GUI object corresponding to the first node where the breakpoint was added. Once the AUT has reached the GUI object corresponding to the first node, the flow will stop and can include displaying the values of the parameters to be passed to the AUT to transition from this GUI object to the GUI object corresponding to the second node (1408). The method 1400 does not initially pass these parameter values, since they are the parameter values encompassed by the GUI event corresponding to the selected edge at which the breakpoint has been placed.

Figure 15:
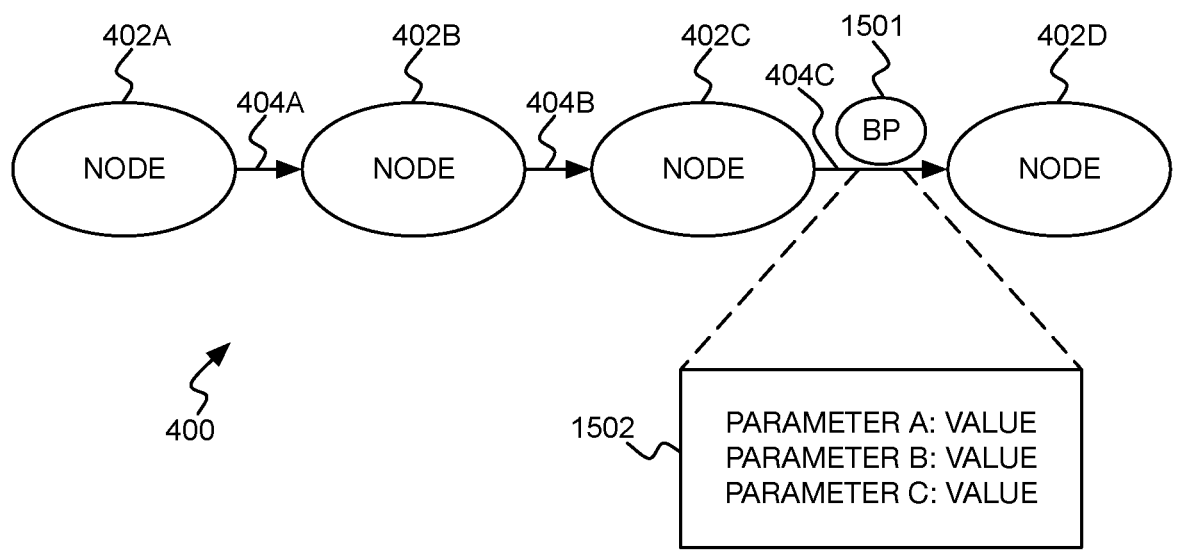
FIG. 15 is a diagram illustrating example performance of the method of FIG. 14.

FIG. 15 illustratively depicts example performance of the method 1400. A portion of the directed graph 400 of FIG. 4 is shown in FIG. 15. Specifically, FIG. 15 shows all the nodes 402 of the directed graph 400 in linear fashion, as well as the edges 404A, 404B, and 404C interconnecting the nodes 402. A user has placed a breakpoint 1501 at the edge 404C. Therefore, starting at the GUI object corresponding to the node 402A, the AUT is passed the parameter values encompassed by the GUI event corresponding to the edge 404A to transition to the GUI object corresponding to the node 402B. The AUT is then passed the parameter values encompassed by the GUI event corresponding to the edge 404B to transition to the GUI object corresponding to the node 402C.

The parameter values 1502 that were previously passed to the AUT in transitioning from the GUI object corresponding to the node 402C to transition to the GUI object corresponding to the node 402D are then displayed, because the AUT has reached the GUI object corresponding to the node 402C. The parameter values 1502 are encompassed by the GUI event corresponding to the edge 404C at which the user has placed the breakpoint 1501. However, the parameter values 1502 are not then passed to the AUT to transition to the GUI object corresponding to the node 402D, because the breakpoint 1501 at the edge 404C signifies that execution of the AUT is to pause or stop at the GUI event corresponding to the edge 404C.

FIG. 16 shows an example method 1600 for performing GUI event-level fault-injection testing of an AUT, based on a directed graph for the AUT. As with the other methods that have been described, the method 1600 can be implemented as program code stored on a non-transitory computer-readable data storage medium and executable by a processor of a computing device. The method 1600 can include displaying the directed graph for the AUT that has been generated (1602). As in the methods of FIGS. 12 and 14, displaying the directed graph can include displaying the actual graph itself, or the representation of the GUI of the AUT to which the graph corresponds.

The method 1600 can include receiving identification of a selected edge connecting a first node to a second node of the directed graph (1604), and modifying values of parameters encompassed by the GUI event corresponding to the selected edge (1606). For example, a user may navigate the directed graph (e.g., by single stepping or based on a breakpoint) as has been displayed, and select an edge of interest. In response, the parameter values encompassed by the corresponding GUI event may be displayed. These values are the values of the parameters that were recorded when the communication from the client computing device to the host computing device was monitored to generate the directed graph. The user may then modify the parameter values.

The method 1600 may suggest the modified parameter values in one implementation. For example, permissible values for the parameters may have been previously determined via machine learning, as per the method of FIG. 10. The user may be suggested modified values for the parameters that are permissible, or even that are impermissible. As to the latter, for instance, an impermissible parameter value may be suggested to assess how the AUT handles an unexpected, potentially malformed parameter value. The modified parameter values represent a fault to be injected, in that the modified parameter values will be passed to the AUT instead of the unmodified parameter values that were collected when inter-client computing device-to-host computing device communication was monitored.

The method 1600 can include then causing the AUT to reach the GUI object corresponding to the first node that the selected edge directly connects to the second node (1608), as has been described above in relation to the method of FIG. 14. Once the AUT has reached the GUI object corresponding to the first node, the method 1600 can include passing the modified parameter values to the AUT (1610). That is, instead of passing the (unmodified) parameter values that were actually previously passed to the AUT to transition from the GUI object corresponding to the first node to the GUI object corresponding to the second node, the parameter values as have been modified are passed to the AUT, to fault-inject test the AUT.

The method 1600 can include then assessing how the AUT handles passage of the modified passage values (1612). For example, it may be expected that even when being passed the modified parameter values, the AUT should still transition to the GUI object corresponding to the second node. If the AUT does not transition to the GUI object corresponding to the second node, then the AUT is not performing correctly. As another example, it may be expected that passage of the modified parameter values will not result in AUT transition to the GUI object corresponding to the second node. However, whether the AUT gracefully handles such unexpected modified parameter value passage may be of interest. For example, if the AUT crashes instead of displaying an error message, then the AUT may not be performing correctly.

FIG. 17 illustratively depicts example performance of the method 1600. A portion of the directed graph 400 of FIG. 4 is shown in FIG. 17. FIG. 17 shows the nodes 402A, 402B, and 402C of the graph 400 in linear fashion, with their interconnecting edges 404A and 404B. Responsive to selection of the edge 404B by the tester, the parameter values 1702 encompassed by the GUI event corresponding to the edge 404B are displayed, and then modified by the tester. The AUT is caused to reach the GUI object corresponding to the node 402B from which the AUT normally transitions upon occurrence of the GUI event corresponding to the selected edge 404B.

Upon reaching the GUI object corresponding to the node 402B, the AUT is passed the modified parameter values 1702, instead of the (unmodified) parameter values encompassed by the edge 404B corresponding to the selected edge 404B. How the AUT handles the modified parameter values 1702 can then be assessed. The AUT may still transition to the GUI object corresponding to the node 402C, for instance, which may be expected or unexpected. The AUT may crash, signifying that the fault injection represented by the modified parameter values 1702 is catastrophic. The AUT may transition to a GUI object other than that corresponding to the node 402C. Such transition may be indicative of proper error handling by the AUT, improper functioning of the AUT, or even a potential security vulnerability of the AUT.

The debugging and fault-injection testing of the AUT that has been described is performed at the GUI event level. The step-by-step debugging of FIGS. 12 and 13 is performed at the GUI event level in that the parameter values that have been passed to the AUT in transitioning between GUI objects are displayed for selected GUI events. The breakpoint-based debugging of FIGS. 14 and 15 is performed at the GUI event level in that breakpoints are placed at selected GUI events. The fault-injection testing of FIGS. 16 and 17 is performed at the GUI event level in that parameter values to be passed to the AUT to transition between GUI objects are modified for selected GUI events.

It is noted that GUI event-level fault injection testing has been described separately from GUI event-level debugging. However, the fault injection testing may be integrated with such debugging. For example, the fault-injection testing described in relation to FIGS. 16 and 17 may be integrated within the step-by-step debugging of FIGS. 12 and 13, and may similarly be integrated within the debugging of FIGS. 14 and 15 that utilizes breakpoints.

Figure 18:
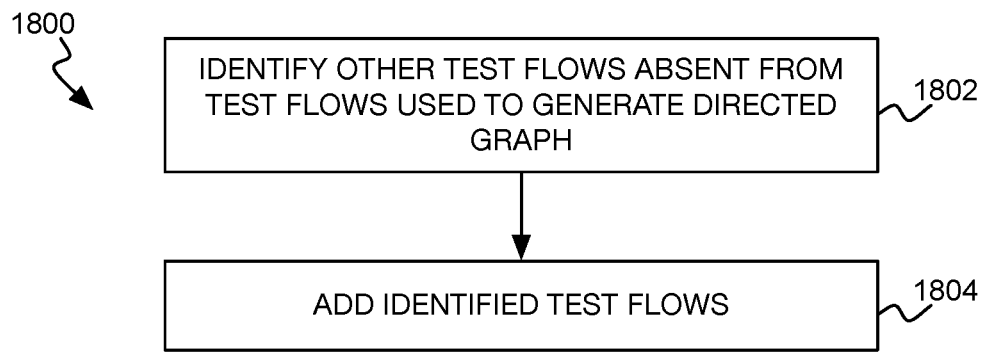
FIG. 18 is a flowchart of an example method for analyzing test flows against a directed graph to identify additional test flows.

FIG. 18 shows an example method 1800 for identifying other test flows that traverse the GUI of the AUT, besides the test flows on which basis the directed graph was generated. More specifically, the method 1800 identifies test flows that traverse the GUI objects corresponding to the nodes of the graph and the GUI events corresponding to the edges of the graph in sequences different than the test flows that were used to generate the graph. As with the other methods that have been described, the method 1800 can be implemented as a non-transitory computer-readable data storage medium storing program code executable by a processor of a computing device. The method 1800 is one way by which the test flows from which the directed graph was generated can be analyzed against the graph to assess coverage of the graph by the test flows.

The method 1800 includes identifying, based on the directed graph, other test flows absent from (i.e., different than) the test flows used to generate the directed graph (1802). For instance, a breadth-first search (BFS) technique or a depth-first search (DFS) technique can be employed to identify unique paths through the directed graph. There may be constraints governing how the paths are identified. For example, the minimum and/or maximum number of node traversals for a given path may be specified, where each unique node of the graph may be traversed in a path multiple times, and each time a node is traversed is counted as to a separate node traversal. Specifying the minimum number of node traversals ensures that insufficiently short paths are not identified, whereas specifying the maximum number of node traversals ensures that the techniques actually finish, and do not enter into endless loops.

Another example of a constraint governing how the paths are identified can include specification of the minimum number of unique nodes that have to be traversed in a given path, and/or the maximum number of unique nodes that can be traversed in a given path. Furthermore, the maximum number of times a given node can be traversed in a path may be specified, which can ensure that a path does not, for instance, traverse back and forth between two nodes or circle among a larger number of nodes too many times. The ending node of a path may also be specified, such as the same node as the starting node. The maximum number of paths that are to be identified may be specified as well. Other constraints may further be imposed on the BFS or DFS technique employed to identify paths through the directed graph.

The identified paths through the directed graph correspond to test flows that traverse the GUI of the AUT corresponding to the graph. Therefore, the identified paths can be compared to the test flows on which basis the directed graph was originally generated. Any test flow corresponding to a path through the directed graph that is not one of the test flows that were used to generate the graph is thus identified as an additional test flow. The method 1800 can include then adding such identified test flows (1804). Therefore, when further testing of the AUT occurs, there is a more complete set of test flows on which basis such testing occurs, so that testing is more fully performed.

In one implementation, once new test flows have been identified, they can be displayed to the user for selection for execution against the AUT. The newly identified test flows will be untested test flows, in that the GUI of the AUT has not yet been traversed in accordance with them. Therefore, the new test flows may be presented by the user so that the user can select which of these as yet untested test flows should be executed against the AUT so that the UAT can be accordingly tested.

Figure 19:
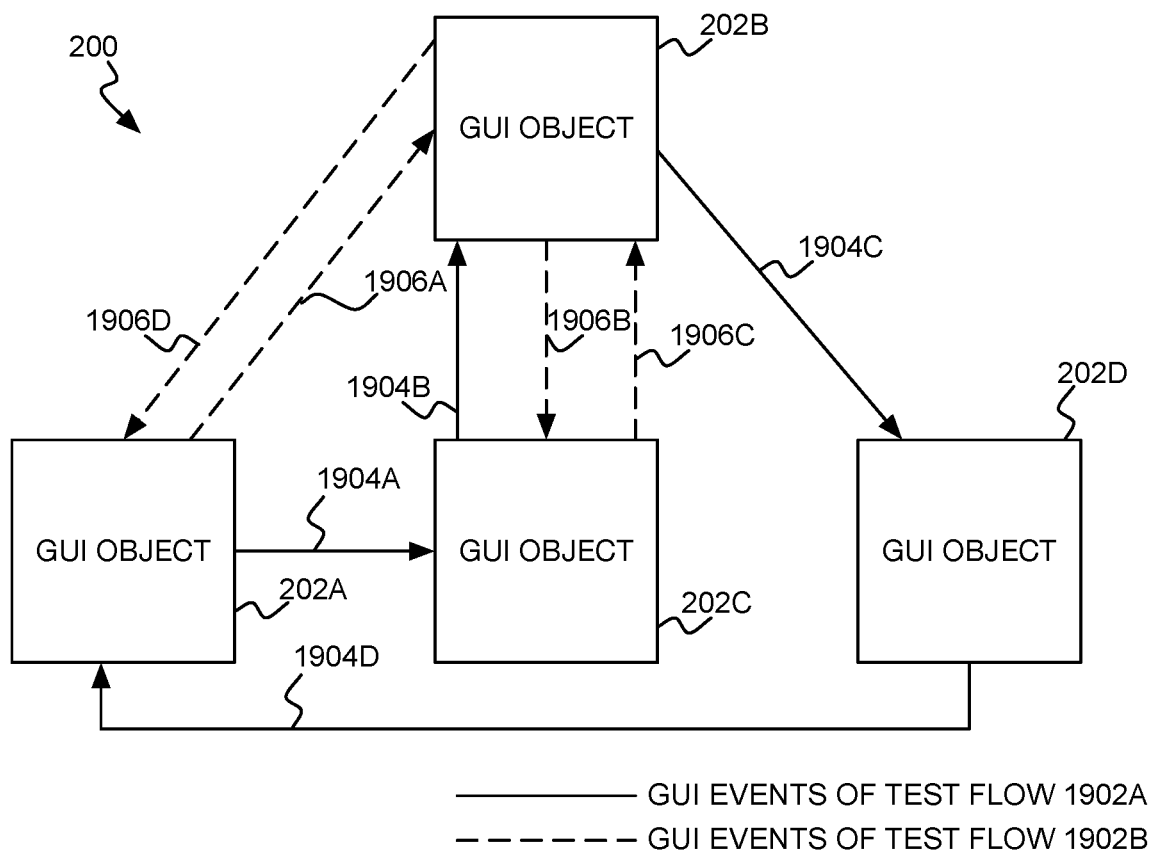
FIG. 19 is a diagram illustrating example performance of the method of FIG. 18.

FIG. 19 illustratively depicts example performance of the method 1800. Specifically, FIG. 19 diagrammatically depicts identification of two additional test flows 1902A and 1902B, collectively referred to as the test flows 1902, which traverse the GUI 200 of FIG. 2. The test flows 1902 are identified based on the directed graph 400 of FIG. 4 for the AUT having the GUI 200, but differ from the test flows 204 of FIG. 2 on which basis the graph 400 was generated. The test flow 1902A includes traversal of the GUI objects 202 via GUI events 1904A, 1904B, 1904C, and 1904D, which are collectively referred to as the GUI events 1904, and which are depicted in FIG. 19 as solid lines. The test flow 1902B includes traversal of the GUI objects 202A, 202B, and 202C via GUI events 1906A, 1906B, 1906C, and 1906D, which are collectively referred to as the GUI events 1906, and which are depicted in FIG. 19 as dashed lines.

The test flow 1902A specifically transitions from the GUI object 202A to the GUI object 202C via the GUI event 1904A, which corresponds to the edge 404F of FIG. 4 and thus which can be the same GUI event as the GUI event 210A of FIG. 2. The test flow 1902A transitions from the GUI object 202C to the GUI object 202B via the GUI event 1904B, which corresponds to the edge 404G of FIG. 4 and thus which can be the same GUI event as the GUI event 210B of FIG. 2. The test flow 1902A transitions from the GUI object 202B to the GUI object 202D via the GUI event 1904C, which corresponds to the edge 404E of FIG. 4 and thus which can be the same GUI event as the GUI event 208B of FIG. 2. The test flow 1902A transitions from the GUI object 202D back to the GUI object 202A via the GUI event 1904D, which corresponds to the edge 404D of FIG. 4 and thus which can be the same GUI event as the GUI events 206D and 208C of FIG. 2.

The test flow 1902B specifically transitions from the GUI object 202A to the GUI object 202B via the GUI event 1906A, which corresponds to the edge 404A of FIG. 4 and thus which can be the same GUI event as the GUI events 206A and 208A of FIG. 2. The test flow 1902B transitions from the GUI object 202B to the GUI object 202C via the GUI event 1906B, which corresponds to the edge 404B of FIG. 4 and thus which can be the same GUI event as the GUI event 206B of FIG. 2. The test flow 1902B transitions from the GUI object 202C back to the GUI object 202B via the GUI event 1906C, which corresponds to the edge 404G of FIG. 4 and thus which can be the same GUI event as the GUI event 210B of FIG. 2. The test flow 1902B transitions from the GUI object 202B back to the GUI object 202A via the GUI event 1906D, which corresponds to the edge 404H of FIG. 4 and thus which can be the same GUI event as the GUI event 210C of FIG. 2.

The described identification of other test flows traversing the GUI of the AUT, besides the test flows that were used to generate the directed graph for the AUT, can be performed without analyzing any source code of the AUT. Rather, such additional test flow identification occurs by analyzing the generated directed graph. It is noted that that the test flows that are identified traverse the GUI objects and the GUI events that have already been traversed by the original test flows on which basis the directed graph was generated, but in different sequences. That is, the identified additional test flows may not traverse any GUI objects or GUI events that have not already been traversed by the original test flows, since the additional test flows are identified based on the directed graph generated from the original test flows.

Figure 20:
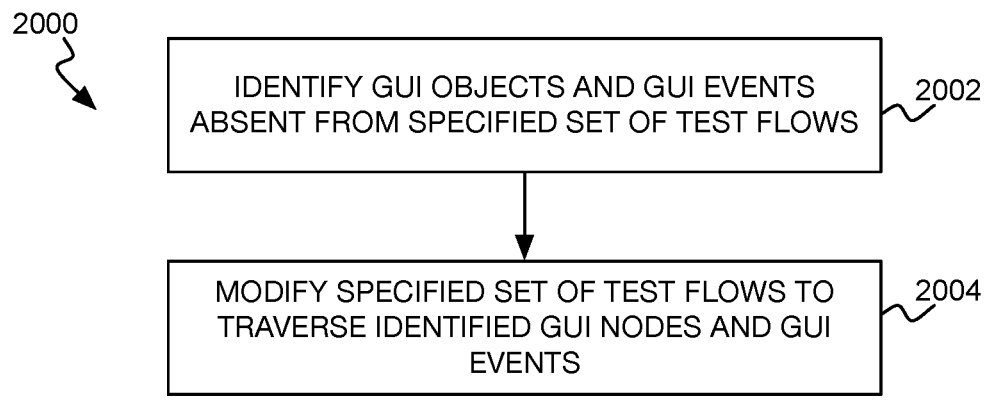
FIG. 20 is a flowchart of an example method for analyzing a specified set of test flows to identify GUI nodes and GUI events that the test flows do not traverse.

FIG. 20 shows an example method 2000 for identifying GUI objects and GUI events of the AUT absent from a specified set of test flows. More specifically, the method 2000 identifies GUI objects corresponding to nodes of the directed graph and GUI events corresponding to the edges of the graph that are not traversed by a specified set of test flows. A tester, for instance, may have identified a specified set of test flows, and want to ensure that the specified test covers all the GUI objects and the GUI events of the AUT. The specified set of test flows can be a subset of the test flows on which basis the directed graph was generated, or another specified set of test flows. As with the other methods that have been described, the method 2000 can be implemented as a non-transitory computer-readable data storage medium storing program code executable by a processor of a computing device. The method 2000 is one way by which test flows can be analyzed against the graph to assess coverage of the graph by the test flows.

The method 2000 includes identifying the GUI objects and the GUI events of the AUT absent from a specified set of test flows (2002), based on the directed graph. For each node of the directed graph, whether the corresponding GUI object is traversed by any test flow within the specified set can be determined. Similarly, for each edge of the directed graph, whether the corresponding GUI event is traversed by any test flow within the specified set can be determined. The method 2000 can include then modifying the specified set of test flows so that they traverse any such identified GUI objects and GUI events (2004). For example, one or more of the test flows of the specified set may be modified so that they also traverse the identified GUI objects and GUI events. In this implementation, no new test flows may be added to the specified set of test flows. The test flows of the specified set may be modified by a tester, or programmatically via a specified technique or algorithm.

Figure 21:
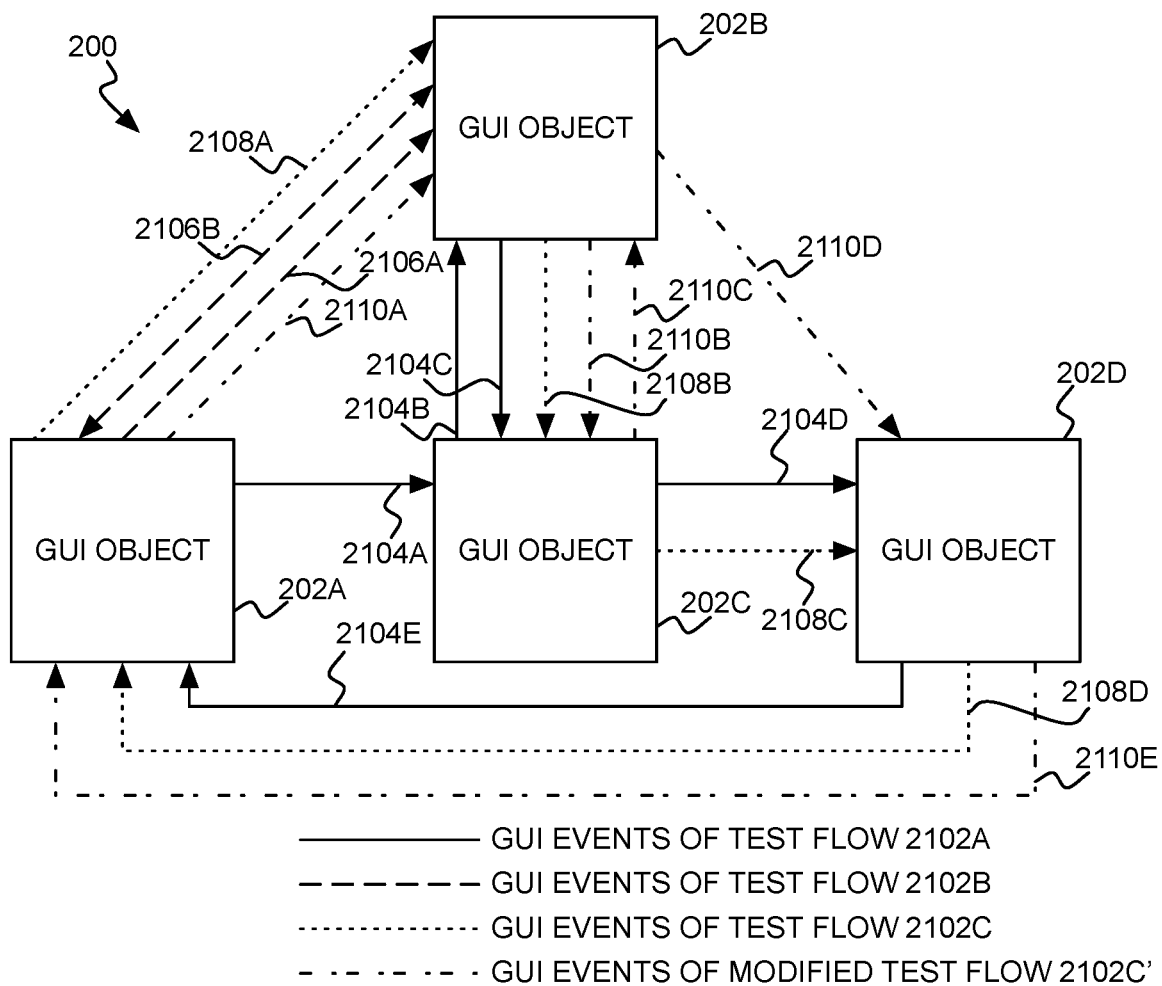
FIG. 21 is a diagram illustrating example performance of the method of FIG. 20.

FIG. 21 illustratively depicts example performance of the method 2000. Specifically, FIG. 21 diagrammatically depicts a specified set of test flows 2102A, 2102B, and 2102C, collectively referred to as the test flows 2100, which traverse the GUI 200 of FIG. 2. Whether the test flows 2102 in total traverse every GUI object 202 and every GUI event 206 of the GUI 200 can be determined based on the graph 400 of FIG. 4 for the AUT having the GUI 200. The test flow 2102A traverses the GUI objects 202 via GUI events 2104A, 2104B, 2104C, 2104D, and 2104E, which are collectively referred to as the GUI events 2104, and which are depicted in FIG. 21 as solid lines.

The test flow 2102A transitions from the GUI object 202A to the GUI object 202C via the GUI event 2104A, which corresponds to the edge 404F of FIG. 4 and thus which can be the same GUI event as the GUI event 210A of FIG. 2. The test flow 2102A transitions from the GUI object 202C to the GUI object 202B via the GUI event 2104B, which corresponds to the edge 404G of FIG. 4 and thus which can be the same GUI event as the GUI event 210B of FIG. 2. The test flow 2102A transitions from the GUI object 202B back to the GUI object 202C via the GUI event 2104C, which corresponds to the edge 404B of FIG. 4 and thus which can be the same GUI event as the GUI event 206B of FIG. 2. The test flow 2102A transitions from the GUI object 202C to the GUI object 202D via the GUI event 2104D, which corresponds to the edge 404C of FIG. 4 and thus which can be the same GUI event as the GUI event 206C of FIG. 2. The test flow 2102A transitions from the GUI object 202D back to the GUI object 202A via the GUI event 2104E, which corresponds to the edge 404D of FIG. 4 and thus which can be the same GUI event as the GUI events 206D and 208C of FIG. 2.

The test flow 2102B traverses the GUI objects 202A and 202B via the GUI events 2106A and 2106B, which are collectively referred to as the GUI events 2106, and which are depicted in FIG. 21 as dashed lines. From the GUI object 202A, the test flow 2102B transitions to the GUI object 202B via the GUI event 2106A, which corresponds to the edge 404A of FIG. 4 and thus which can be the same GUI event as the GUI events 206A and 208A of FIG. 2. From the GUI object 202B, the test flow 2102B transitions back to the GUI object 202A via the GUI event 2106B, which corresponds to the edge 404H of FIG. 4 and thus which can be the same GUI event as the GUI event 210C of FIG. 2.

The test flow 2102C traverses the GUI objects 202 via the GUI events 2108A, 2108B, 2108C, and 2108D, which are collectively referred to as the GUI events 2108, and which are depicted in FIG. 21 as dotted lines. From the object 202A, the test flow 2102C transitions to the GUI object 202B via the GUI event 2108A, which can be the same as the GUI event 2106A and which corresponds to the edge 404A of FIG. 4. The test flow 2102C transitions from the GUI object 202B to the GUI object 202C via the GUI event 2108B, which can be the same as the GUI event 2104C and which corresponds to the edge 404B of FIG. 4. The test flow 2102C transitions from the GUI object 202C to the GUI object 202D via the GUI event 2108C, which can be the same as the GUI event 2104D and which corresponds to the edge 404C of FIG. 4. The test flow 2102C transitions from the GUI object 202D back to the GUI object 202A via the GUI event 2108D, which can be the same as the GUI event 2104E and which corresponds to the edge 404D of FIG. 4.

All the nodes 204 are traversed by one or more of the test flows 2102. However, the test flows 2102 do not traverse the GUI event 208B of FIG. 2, which transitions from the GUI object 202B to the GUI object 202D and which corresponds to the edge 404E of FIG. 4. Therefore, in the example of FIG. 21, the test flow 2102C is modified as the modified test flow 2102C' to traverse this identified GUI event 208B of FIG. 2. The modified test flow 2102C' specifically traverses the GUI objects 202 via the GUI events 2110A, 2110B, 2110C, 2110D, and 2110E, which are collectively referred to as the GUI events 2110 and which are depicted in FIG. 21 in lines of alternating dashes and dots.

From the GUI object 202A, the modified test flow 2102C' transitions to the GUI object 202B via the GUI event 2110A that is identical to the GUI event 2108A of the unmodified test flow 2102C. Similarly, the modified test flow 2102C' transitions form the GUI object 202B to the GUI object 202C via the GUI event 2110B that is identical to the GUI event 2108B of the unmodified test flow 2102C. However, the modified test flow 2102C' transitions from the GUI object 202C back to the GUI object 202B via the GUI event 2110C, which can be the same as the GUI event 2104B and which corresponds to the edge 404G of FIG. 4. By comparison, the unmodified test flow 2102C transitions from the GUI object 202C to the GUI object 202D via the GUI event 2108C.

The modified test flow 2102C' then transitions from the GUI object 202B to the GUI object 202D via the GUI event 2110D, which corresponds to the edge 404E of FIG. 4 and thus which can be the same GUI event as the GUI event 208B of FIG. 2, which the unmodified test flows 2102 do not traverse. From the GUI event 202D, the modified test flow 2102C' transitions back to the GUI object 202A via the GUI event 2110E, no differently than the unmodified test flow 2102C does via the GUI event 2108D. Therefore, the GUI event 2110E can be identical to the GUI event 2108D (as well as to the GUI event 2104E), and thus corresponds to the edge 404D of FIG. 4.

Figure 22:
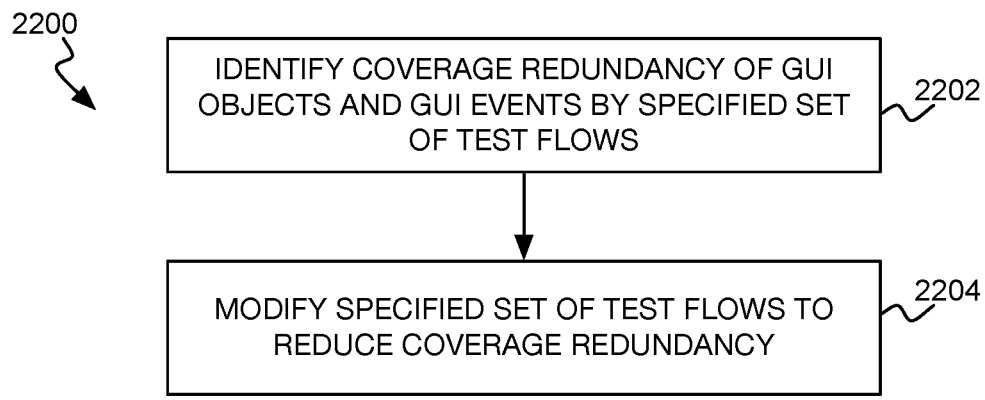
FIG. 22 is a flowchart of an example method for analyzing a specified set of test flows to identify GUI nodes and GUI events covered by more than one of the test flows.

FIG. 22 shows an example method 2200 for analyzing a specified set of test flows to identify GUI nodes and GUI events that more than one of the test flows traverse. More specifically, the method 2200 determines whether the GUI objects corresponding to nodes of the directed and the GUI events corresponding to edges of the graph are each traversed by more than one test flow of the specified set. A tester, for instance, may have identified a specified set of test flows, and want to have the test flows most efficiently cover the GUI objects and the GUI events of the AUT. That is, the tester may want each GUI object and GUI event to be traversed the smallest number of test flows within the specified set. The specified set of test flows can be the set of test on which basis the directed graph was generated, or another specified set of test flows. The method 2200, like the previously described methods, can be implemented as a non-transitory computer-readable data storage medium storing program code executable by a processor of a computing device, and is one way by which test flows can be analyzed against the graph to assess coverage of the graph by the test flows.

The method 2200 includes identifying coverage redundancy of the GUI objects and the GUI events by the specified set of test flows (2202), based on the directed graph. For each node of the directed graph, the number of test flows within the specified set that traverse the GUI object corresponding to the node may be counted. Similarly, for each edge of the graph, the number of test flows within the specified set that traverse the GUI event corresponding to the edge may be counted. The method 2200 can include then modifying the specified set of test flows to reduce coverage redundancy of the GUI objects and the GUI events by the specified set of test flows (2204).

For example, one or more of the test flows of the specified set may be modified so that they do not traverse GUI objects and GUI events that are traversed by more than a threshold number of test flows, to the extent possible. The GUI objects and GUI events traversed by more than the threshold number of test flows may be identified, and a tester may modify the test flows of the specified set to reduce the number of test flows that traverse these GUI objects and GUI events, insofar as possible. In another implementation, the test flows may be modified programmatically via a specified technique or algorithm to reduce such coverage redundancy.

Figure 23:
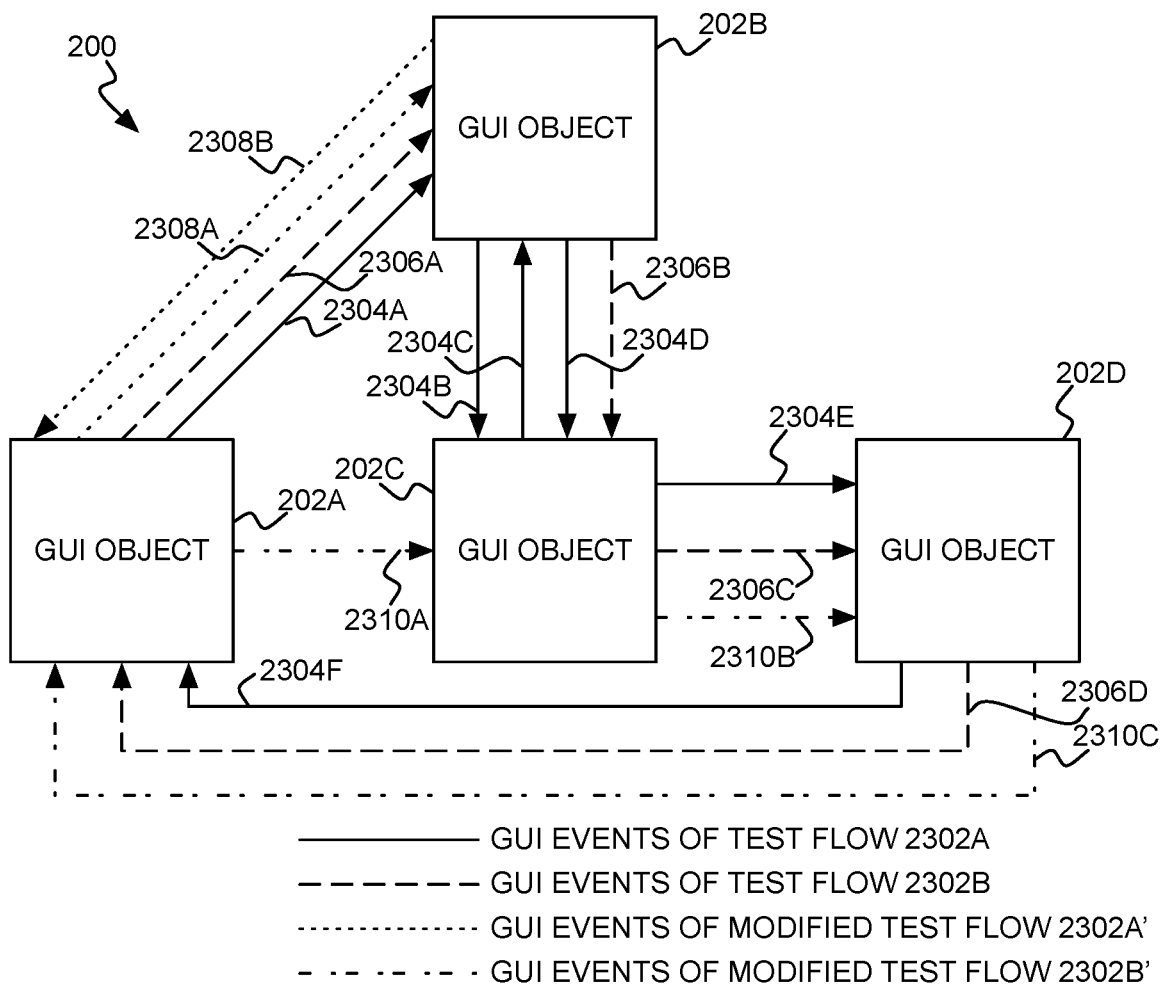
FIG. 23 is a diagram illustrating example performance of the method of FIG. 23.

FIG. 23 illustratively depicts example performance of the method 2200. Specifically, FIG. 23 diagrammatically depicts a specified set of test flows 2302A and 2302B, collectively referred to as the test flows 2302, which traverse the GUI 200 of FIG. 2. The test flow 2302A traverses the GUI objects 202 via GUI events 2304A, 2304B, 2304C, 2304D, 2304E, and 2304F, which are collectively referred to as the GUI events 2304, and which are depicted in FIG. 23 as solid lines. The test flow 2302B traverses the GUI objects 202 via GUI events 2306A, 2306B, 2306C, and 2306D, which are collectively referred to as the GUI events 2306, and which are depicted in FIG. 23 as dashed lines.

The test flow 2302A transitions from the GUI object 202A to the GUI object 202B via the GUI event 2304A, which corresponds to the edge 404A of the directed graph of FIG. 4 for the AUT having the GUI 200 of FIG. 2. The test flow 2302A transitions from the GUI object 202B to the GUI object 202C via the GUI event 2304B, which corresponds to the edge 404B of FIG. 4. The test flow 23022 transitions from the GUI object 202C back to the GUI object 202B via the GUI event 2304C, which corresponds to the edge 404G of FIG. 4. The test flow 2302A then again transitions from the GUI object 202B to the GUI object 202C, via the GUI event 2304D, which may be the same GUI event as the GUI event 2304C. The test flow 2302A transitions from the GUI object 202C to the GUI object 202D via the GUI event 2304E, which corresponds to the edge 404C of FIG. 4. The test flow 2302A transitions from the GUI object 202D back to the GUI object 202A via the GUI event 2304F, which corresponds to the edge 404D of FIG. 4.

The test flow 2302B transitions from the GUI object 202A to the GUI object 202B via the GUI event 2306A, which may be the same GUI event as the GUI event 2304A. The test flow 2302B transitions from the GUI object 202B to the GUI object 202C via the GUI event 2306B, which may be the same GUI event as the GUI events 2304B and 2304D. The test flow 2302B transitions from the GUI object 202C to the GUI object 202D via the GUI event 2306C, which may be the same GUI event as the GUI event 2304E. The test flow 2302B transitions from the GUI object 202D back to the GUI object 202A via the GUI event 2306D, which may be the same GUI event as the GUI event 2304F.

The GUI object 202A is thus traversed once by each test flow 2302. The GUI object 202B is traversed twice by the test flow 2302A and once by the test flow 2302B. The GUI object 202C is traversed twice by the test flow 2302A and once by the test flow 2302B. The GUI object 202D is traversed once by each test flow 2302.

The GUI event corresponding to the edge 404A of FIG. 4 (i.e., the GUI events 2304A and 2306A) is traversed once by each test flow 2302. The GUI event corresponding to the edge 404B of FIG. 4 (i.e., the GUI events 2304B, 2304D, and 2306B) is traversed twice by the test flow 2302A and once by the test flow 2302B. The GUI event corresponding to the edge 404C of FIG. 4 (i.e., the GUI events 2304E and 2306C) is traversed once by each test flow 2302. The GUI event corresponding to the edge 404D of FIG. 4 (i.e., the GUI events 2304F and 2306D) is traversed once by each test flow 2302. The GUI events corresponding to the edges 404E, 404F, and 404H of FIG. 4 are not traversed by either test flow 2302. The GUI event corresponding to the edge 404G of FIG. 4 is traversed by once, by just the test flow 2302A.

To reduce coverage redundancy by the test flows 2302, the test flows 2302A and 2302B are respectively modified in the example of FIG. 23 as the modified test flows 2302A' and 2302B', which are collectively referred to as the modified test flows 2302'. The modified test flow 2302A' traverses the GUI objects 202A and 202B via the GUI events 2308A and 2308B, which are collectively referred to as the GUI events 2308 and which are depicted in FIG. 23 as dotted lines. The modified test flow 2302B' traverses the GUI objects 202A, 202C, and 202D via the GUI events 2310A, 2310B, and 2310C, which are collectively referred to as the GUI events 2310 and which are depicted in FIG. 23 as alternatingly dashed and dotted lines.

The modified test flow 2302A' transitions from the GUI object 202A to the GUI object 202B via the GUI event 2308A that is identical to the GUI event 2304A of the unmodified test flow 2302A. However, the modified test flow 2302A' then transitions from the GUI object 202B back to the GUI object 202A via the GUI event 2308B, which corresponds to the edge 404H of FIG. 4. (By comparison, the unmodified test flow 2302A transitions from the GUI object 202B to the GUI object 202C via the GUI event 2304B, as has been described above.)

The modified test flow 2302B' transitions from the GUI object 202A to the GUI object 202C via the GUI event 2310A, which corresponds to the edge 404F of FIG. 4. (By comparison, the unmodified test flow 2302B transitions from the GUI object 202A to the GUI object 202B via the GUI event 2306A, as has been described above.) The modified test flow 2302B' transitions from the GUI object 202C to the GUI object 202D via the GUI event 2310B that is identical to the GUI event 2306C of the unmodified test flow 2302B. The modified test flow 2302B' transitions from the GUI object 202D back to the GUI object 202A via the GUI event 2310C that is identical to the GUI event 2306D of the unmodified test flow 2302B.

The GUI object 202A is thus traversed once by each modified test flow 2302', as was the case with the unmodified test flows 2302. The GUI object 202B is traversed once by just the modified test flow 2302A', instead of twice by the unmodified test flow 2302A and once by the unmodified test flow 2302B. The GUI object 202C is traversed once by just the modified test flow 2302B', instead of twice by the unmodified test flow 2302A and once by the unmodified test flow 2302B. The GUI object 202D is traversed once by just the modified test flow 2302B', instead of once by each unmodified test flow 2302.

The GUI event corresponding to the edge 404A of FIG. 4 is traversed once by just the modified test flow 2302A', instead of once by each unmodified test flow 2302. The GUI event corresponding to the edge 404B of FIG. 4 is not traversed by either modified test flow 2302', though, as opposed to twice by the unmodified test flow 2302A and once by the unmodified test flow 2302B. The GUI event corresponding to the edge 404C of FIG. 4 is traversed once by just the modified test flow 2302B', instead of once by each unmodified test flow 2302. The GUI event corresponding to the edge 404D of FIG. 4 is traversed once by just the modified test flow 2302B', instead of once by each unmodified test flow 2302.

The GUI event corresponding to the edge 404E of FIG. 4 is not traversed by either modified test flow 2302', as was the case with the unmodified test flows 2302. The GUI event corresponding to the edge 404F of FIG. 4 is traversed once by just the modified test flow 2302B', though, as opposed to by neither unmodified test flow 2302. The GUI event corresponding to the edge 404G is not traversed by either modified test flow 2302', as opposed to by just the unmodified test flow 2302A. The GUI event corresponding to the edge 404H is traversed once by just the modified test flow 2302A', as opposed to by neither unmodified test flow 2302.

Therefore, in the example of FIG. 23, the number of test flows that traverse the GUI objects 202C and 202D has been reduced from both of the test flows 2302 to just one of the unmodified test flows 2302'. The number of test flows that traverse the GUI events corresponding to the edges 404A, 404C, and 404D of FIG. 4 have similarly been reduced to one. The number of times any test flow traverses the GUI events corresponding to the edges 404B and 404G of FIG. 4, however, has been reduced to zero, and the number of test flows that traverse the GUI events corresponding to the edges 404F and 404H of FIG. 4 has been increased to one.

The tester, though, may be more concerned with reducing coverage redundancy of the GUI objects 202 as opposed to the GUI events corresponding to the edges 404 of FIG. 4. That is, the tester may be less concerned that any particular GUI event is traversed. The modified test flows 2302' reduce coverage redundancy in this respect as compared to the unmodified test flows 2302.

Figure 24:
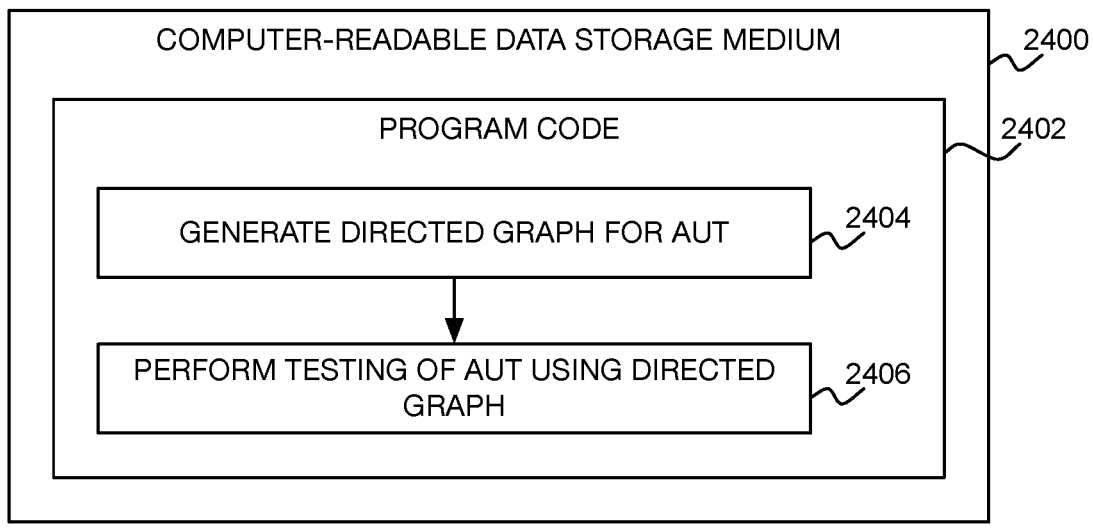
FIG. 24 is a diagram of an example non-transitory computer-readable data storage medium.

FIG. 24 shows an example non-transitory computer-readable data storage medium 2400 storing program code 2402. The program code 2402 is executable by a processor to perform processing. The processing includes generating, for display, a directed graph for an AUT hosted at a host computing device, based on test flows, by monitoring user interaction with a GUI of the AUT at a client computing device and monitoring communication from the client computing device to the host computing device resulting from the user interaction (2404). The processing includes performing testing of the AUT using the directed graph that has been generated (2406).

As has been described, each test flow traverses GUI objects of the AUT via GUI events. Each GUI event is associated with a transition from a first GUI object of the AUT to a second GUI object of the AUT. Each GUI event represents the user interaction with the GUI of the AUT resulting in the associated transition. Each GUI event encompasses values of parameters passed within the communication from the client computing device to the host computing device that occurred responsive to the user interaction resulting in the associated transition. As has also been described, the directed graph includes nodes. Each node corresponds to a GUI object of the AUT and each edge corresponds a GUI event of the AUT.

Figure 25:
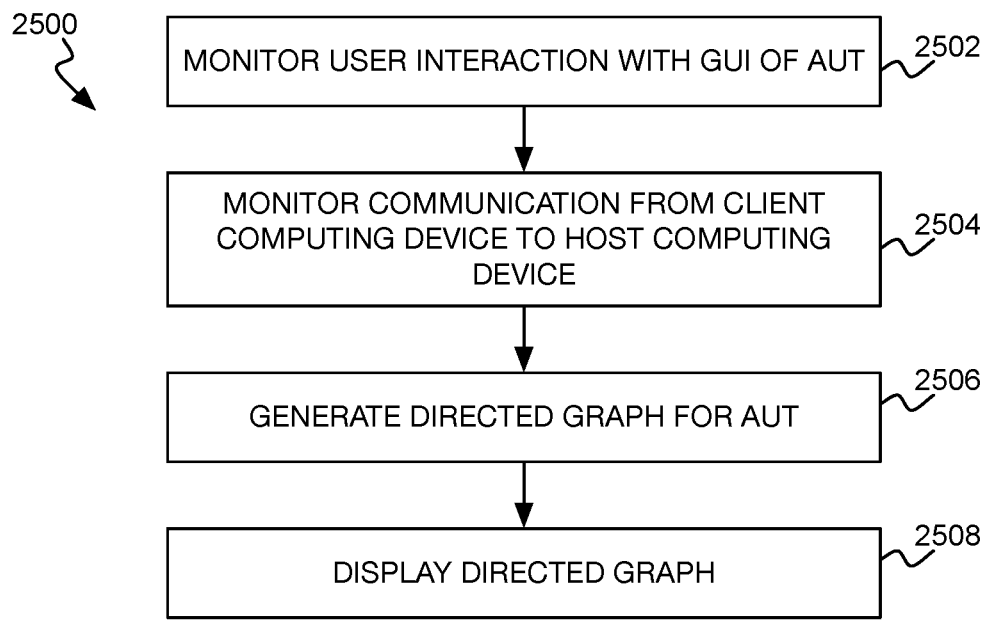
FIG. 25 is a flowchart of an example method.

FIG. 25 shows an example method 2500. The method 2500 includes monitoring user interaction with a GUI of an application under test AUT (2502). The method 2500 includes monitoring communication from a client computing device at which the user interaction is occurring and a host computing device hosting the AUT, where the communication results from the user interaction (2504). The method 2500 includes generating a directed graph of the AUT, based on test flows and from the user interaction and the communication that have been monitored (2506). The method 2500 includes displaying the directed graph of the AUT (2508).

As has been described, each test flow traverses GUI objects of the AUT via GUI events in both FIGS. 24 and 25. Each GUI event is associated with a transition from a first GUI object of the AUT to a second GUI object of the AUT. Each GUI event represents the user interaction with the GUI of the AUT resulting in the associated transition. Each GUI event encompasses values of parameters passed within the communication from the client computing device to the host computing device that occurred responsive to the user interaction resulting in the associated transition. As has also been described, the directed graph includes nodes. Each node corresponds to a GUI object of the AUT and each edge corresponds a GUI event of the AUT.

Techniques have been described herein provide for different types of testing based on a generated directed graph for an AUT. The directed graph can be generated by monitoring user interaction with a GUI of the AUT and communication between a client computing device at which the GUI is accessed and a host computing device at which the AUT is hosted. As such, source code for the AUT does not have to be analyzed to generate the GUI. Furthermore, the testing that can be performed using the generated directed graph can occur at a GUI event level, which is a higher level than comparable testing that is performed at the level of individual lines of source guide, and thus which may provide for more efficient testing of the AUT.

We claim:

1. A non-transitory computer-readable data storage medium storing code executable to perform processing comprising:
    generating, for display, a directed graph for an application under test (AUT) hosted at a host computing device, based on test flows, by monitoring interaction with a graphical user interface (GUI) of the AUT at a client computing device and monitoring communication from the client computing device to the host computing device resulting from the interaction,
        each test flow traversing GUI objects of the AUT via GUI events, each GUI event associated with a transition from a first GUI object of the AUT to a second GUI object of the AUT, representing the interaction resulting in the transition, and encompassing values of parameters passed within the communication that identify a GUI element of the first GUI object that has been selected to cause the transition,
        the directed graph comprising nodes, each node corresponding to a GUI object of the AUT and each edge corresponding to a GUI event of the AUT;
    directly analyzing source code for the AUT to detect any GUI objects and any GUI events that have not been traversed by the test flows by analyzing an event service routine of the source code;
    adding new nodes for any GUI objects that have not been traversed by the test flows and new edges for any GUI events that have not been traversed by the test flows, to the directed graph; and
    performing testing of the AUT using the directed graph that has been generated.

2. The non-transitory computer-readable data storage medium of claim 1, wherein the directed graph for the AUT is generated based on the test flows without direct analysis of any source code of the AUT.

3. The non-transitory computer-readable data storage medium of claim 1, wherein generating the directed graph for the AUT, based on the test flows, comprises:
    in response to monitoring the communication from the client computing device to the host computing device, detecting a new GUI object of the AUT being accessed at the client computing device, and as a result of the communication, the client computing device accessing a current GUI object of the AUT when the communication is detected;
    determining whether the directed graph has a node corresponding to the new GUI object; and
    in response to determining that the directed graph does not have a node corresponding to the new GUI object, adding a new node to the directed graph corresponding to the new GUI object and adding a new edge to the directed graph from a node corresponding to the current GUI object to the new node,
    wherein the new edge corresponds to a GUI event associated with transition of the AUT from the current GUI object to the new GUI object.

4. The non-transitory computer-readable data storage medium of claim 3, wherein generating the directed graph for the AUT, based on the test flows, further comprises:
    in response to determining that the directed graph has a node representing the new GUI object, determining whether the directed graph has an edge from the node corresponding to the current GUI object to the node representing the new GUI object; and
    in response to determining that the directed graph does not have an edge from the node corresponding to the current GUI object to the node representing the new GUI object, adding the new edge to the directed graph from the node corresponding to the current GUI object to the node representing the new GUI object.

5. The non-transitory computer-readable data storage medium of claim 1, wherein the processing further comprises:
    detecting a GUI event that has not been traversed by the test flows; and
    suggesting a user select the GUI event that has not been traversed by the test flows.

6. The non-transitory computer-readable data storage medium of claim 1, wherein generating the directed graph for the AUT, based on the test flows, comprises:
    performing machine learning to identify specifications of the parameters of which the values are passed to the AUT in transitioning from the first GUI object to the second GUI object.

7. The non-transitory computer-readable data storage medium of claim 1, wherein performing the testing using the directed graph that has been generated comprises:
    performing GUI event-level debugging of the AUT using the directed graph that has been generated, in a step-by step manner and/or using one or more breakpoints added to the directed graph.

8. The non-transitory computer-readable data storage medium of claim 7, wherein performing the GUI event-level debugging of the AUT using the directed graph that has been generated, in the step-by-step manner, comprises:
    receiving identification of a selected edge connecting a first node to a second node of the directed graph; and
    responsively displaying the values of the parameters encompassed by the GUI event corresponding to the selected edge.

9. The non-transitory computer-readable data storage medium of claim 7, wherein performing the GUI event-level debugging of the AUT using the directed graph that has been generated, using the one or more breakpoints added to the directed graph, comprises:
    receiving identification of a selected edge at which a breakpoint has been added, the selected edge connecting a first node to a second node of the directed graph;
    causing the AUT to reach a GUI object corresponding to the first node; and
    displaying the values of the parameters that are to be passed to the AUT to transition from the GUI object corresponding to the first node to a GUI object corresponding to the second node, as encompassed by the GUI event corresponding to the selected edge.

10. The non-transitory computer-readable data storage medium of claim 1, wherein performing the testing using the directed graph that has been generated comprises:
   performing GUI event-level fault-injection testing of the AUT using the directed graph that has been generated.

11. The non-transitory computer-readable data storage medium of claim 10, wherein performing the GUI event-level fault-injecting testing of the AUT using the directed graph that has been generated comprises:
   receiving identification of a selected edge connecting a first node to a second node of the directed graph;
   modifying the values of the parameters encompassed by the GUI event corresponding to the selected edge;
   causing the AUT to reach the GUI object corresponding to the first node; and
   passing the modified values of the parameters encompassed by the GUI event corresponding to the selected edge, to the AUT.

12. The non-transitory computer-readable data storage medium of claim 1, wherein performing the testing using the directed graph that has been generated comprises:
   analyzing the test flows against the directed graph to assess coverage of the directed graph by the test flows.

13. The non-transitory computer-readable data storage medium of claim 12, wherein analyzing the test flows against the directed graph to assess the coverage of the directed graph by the test flows comprises:
   identifying other flows traversing the directed graph that are absent from the test flows on which basis the directed graph was generated; and
   adding the other flows that have been identified.

14. The non-transitory computer-readable data storage medium of claim 12, wherein analyzing the test flows against the directed graph to assess the coverage of the directed graph by the test flows comprises:
   identifying the GUI objects and the GUI events absent from a specified set of the test flows, based on the directed graph; and
   modifying the specified set of the test flows to traverses the GUI objects and the GUI events that have been identified.

15. The non-transitory computer-readable data storage medium of claim 12, wherein analyzing the test flows against the directed graph to assess the coverage of the directed graph by the test flows comprises:
   identifying coverage redundancy of the GUI objects and the GUI events by a specified set of the test flows, based on the directed graph; and
   modifying the specified set of the test flows to reduce the coverage redundancy of the GUI objects and the GUI events by the specified set of the test flows.

16. A non-transitory computer-readable data storage medium storing code executable to perform processing comprising:
   generating, for display, a directed graph for an application under test (AUT) hosted at a host computing device, based on test flows, by monitoring interaction with a graphical user interface (GUI) of the AUT at a client computing device and monitoring communication from the client computing device to the host computing device resulting from the interaction,
      each test flow traversing GUI objects of the AUT via GUI events, each GUI event associated with a transition from a first GUI object of the AUT to a second GUI object of the AUT, representing the interaction resulting in the transition, and encompassing values of parameters passed within the communication that identify a GUI element of the first GUI object that has been selected to cause the transition,
      the directed graph comprising nodes, each node corresponding to a GUI object of the AUT and each edge corresponding to a GUI event of the AUT;
   analyzing the communication from the client computing device to the host computing device and/or communication from the host computing device to the client computing device to detect any GUI objects and any GUI events that have not been traversed by the test flows;
   adding new nodes for any GUI objects that have not been traversed by the test flows and new edges for any GUI events that have not been traversed by the test flows, to the directed graph; and
   performing testing of the AUT using the directed graph that has been generated.

17. The non-transitory computer-readable data storage medium of claim 16, wherein generating the directed graph for the AUT, based on the test flows, comprises:
   in response to monitoring the communication from the client computing device to the host computing device, detecting a new GUI object of the AUT being accessed at the client computing device, and as a result of the communication, the client computing device accessing a current GUI object of the AUT when the communication is detected;
   determining whether the directed graph has a node corresponding to the new GUI object; and
   in response to determining that the directed graph does not have a node corresponding to the new GUI object, adding a new node to the directed graph corresponding to the new GUI object and adding a new edge to the directed graph from a node corresponding to the current GUI object to the new node,
   wherein the new edge corresponds to a GUI event associated with transition of the AUT from the current GUI object to the new GUI object.

18. The non-transitory computer-readable data storage medium of claim 17, wherein generating the directed graph for the AUT, based on the test flows, further comprises:
   in response to determining that the directed graph has a node representing the new GUI object, determining whether the directed graph has an edge from the node corresponding to the current GUI object to the node representing the new GUI object; and
   in response to determining that the directed graph does not have an edge from the node corresponding to the current GUI object to the node representing the new GUI object, adding the new edge to the directed graph from the node corresponding to the current GUI object to the node representing the new GUI object.

19. A non-transitory computer-readable data storage medium storing code executable to perform processing comprising:
   generating, for display, a directed graph for an application under test (AUT) hosted at a host computing device, based on test flows, by monitoring interaction with a graphical user interface (GUI) of the AUT at a client computing device and monitoring communication from the client computing device to the host computing device resulting from the interaction,
      each test flow traversing GUI objects of the AUT via GUI events, each GUI event associated with a transition from a first GUI object of the AUT to a second GUI object of the AUT, representing the interaction resulting in the transition, and encompassing values of parameters passed within the communication that identify a GUI element of the first GUI object that has been selected to cause the transition, the directed graph comprising nodes, each node corresponding to a GUI object of the AUT and each edge corresponding to a GUI event of the AUT; and performing testing of the AUT using the directed graph that has been generated by analyzing the test flows against the directed graph to assess coverage of the directed graph by the test flows, including:

identifying other flows traversing the directed graph that are absent from the test flows on which basis the directed graph was generated, and adding the other flows that have been identified.

20. The non-transitory computer-readable data storage medium of claim 19, wherein generating the directed graph for the AUT, based on the test flows, comprises:

in response to monitoring the communication from the client computing device to the host computing device, detecting a new GUI object of the AUT being accessed at the client computing device, and as a result of the communication, the client computing device accessing a current GUI object of the AUT when the communication is detected;

determining whether the directed graph has a node corresponding to the new GUI object; and in response to determining that the directed graph does not have a node corresponding to the new GUI object, adding a new node to the directed graph corresponding to the new GUI object and adding a new edge to the directed graph from a node corresponding to the current GUI object to the new node, wherein the new edge corresponds to a GUI event associated with transition of the AUT from the current GUI object to the new GUI object.

* * * * *